United States Patent
Dandurand et al.

(10) Patent No.: US 11,932,329 B2
(45) Date of Patent: Mar. 19, 2024

(54) TRACK SYSTEM FOR TRACTION OF A VEHICLE

(71) Applicant: Camso Inc., Magog (CA)

(72) Inventors: Jules Dandurand, Sherbrooke (CA); Andy Levesque, Coaticook (CA)

(73) Assignee: Camso Inc., Magog (CA)

( * ) Notice: Subject to any disclaimer, the term of this patent is extended or adjusted under 35 U.S.C. 154(b) by 1018 days.

(21) Appl. No.: 16/471,833

(22) PCT Filed: Dec. 20, 2017

(86) PCT No.: PCT/CA2017/051567
§ 371 (c)(1),
(2) Date: Jun. 20, 2019

(87) PCT Pub. No.: WO2018/112642
PCT Pub. Date: Jun. 28, 2018

(65) Prior Publication Data
US 2020/0094895 A1 Mar. 26, 2020

Related U.S. Application Data

(60) Provisional application No. 62/436,845, filed on Dec. 20, 2016.

(51) Int. Cl.
*B62D 55/24* (2006.01)
*B32B 3/30* (2006.01)
(Continued)

(52) U.S. Cl.
CPC .............. *B62D 55/244* (2013.01); *B32B 3/30* (2013.01); *B32B 27/20* (2013.01); *B62D 55/26* (2013.01);
(Continued)

(58) Field of Classification Search
CPC ...... B62D 55/244; B62D 55/26; B62M 27/02; B62M 2027/027
See application file for complete search history.

(56) References Cited

U.S. PATENT DOCUMENTS

| 2,514,429 A | 7/1950 | Waugh |
| 3,480,339 A | 11/1969 | Kell |

(Continued)

FOREIGN PATENT DOCUMENTS

| CN | 104742992 | 7/2015 |
| WO | 2018112642 | 6/2018 |

OTHER PUBLICATIONS

International Search Report dated Mar. 27, 2018 in connection with International Patent Application PCT/CA2017/051567, 4 pages.
(Continued)

*Primary Examiner* — Frank B Vanaman
(74) *Attorney, Agent, or Firm* — Hahn Loeser & Parks LLP; Bret A. Hrivnak

(57) ABSTRACT

A track system for traction of a vehicle (e.g., a snowmobile, an all-terrain vehicle (ATV) etc.). The track system comprises a track and a track-engaging assembly for driving and guiding the track around the track-engaging assembly. The track system may have features to enhance its traction, floatation, and/or other aspects of its performance, including the track that may comprise reinforcing material (e.g., reinforcing polymeric material) that is stronger (e.g., stiffer, harder, and/or more resistant to wear) than elastomeric material of the track, such as to improve rigidity characteristics of the track, reduce noise generated by the track system, improve a resistance to wear of the track, and/or reduce a weight of the track. The reinforcing material may be provided as one or more thin layers constituting at least part (e.g., of a periphery) of one or more components of the
(Continued)

track (e.g., a carcass, traction projections, and/or drive/guide lugs).

20 Claims, 34 Drawing Sheets

(51) Int. Cl.
    *B32B 27/20*     (2006.01)
    *B62D 55/26*     (2006.01)
    *B62M 27/02*     (2006.01)

(52) U.S. Cl.
    CPC ......... *B62M 27/02* (2013.01); *B32B 2605/00* (2013.01); *B62M 2027/027* (2013.01)

(56) References Cited

U.S. PATENT DOCUMENTS

| | | | | |
|---|---|---|---|---|
| 3,612,626 A * | 10/1971 | Fuchs | | B62D 55/244 |
| | | | | 305/179 |
| 3,623,780 A * | 11/1971 | Kell | | B62D 55/244 |
| | | | | 305/167 |
| 3,721,477 A * | 3/1973 | Cooper | | B62D 55/244 |
| | | | | 305/167 |
| 4,341,577 A * | 7/1982 | Vandenburgh | | B60C 9/10 |
| | | | | 156/123 |
| 4,795,221 A * | 1/1989 | Simmons | | B62D 55/26 |
| | | | | 305/180 |
| 5,123,881 A * | 6/1992 | Brautigam | | B62D 55/244 |
| | | | | 474/205 |
| 5,447,365 A | 9/1995 | Muramatsu et al. | | |
| 6,948,264 B1 * | 9/2005 | Lyden | | A43B 13/223 |
| | | | | D2/951 |
| 2003/0094854 A1 | 5/2003 | Rodgers et al. | | |
| 2004/0104621 A1 * | 6/2004 | Tsuru | | B62D 55/244 |
| | | | | 305/167 |
| 2005/0092424 A1 * | 5/2005 | Zhang | | C08G 18/4854 |
| | | | | 156/125 |
| 2005/0103540 A1 | 5/2005 | Lavoie | | |
| 2007/0126286 A1 | 6/2007 | Feldmann et al. | | |
| 2009/0224598 A1 | 9/2009 | St-Amant et al. | | |
| 2012/0289667 A1 * | 11/2012 | Lukesova | | C08F 10/00 |
| | | | | 526/113 |
| 2013/0069417 A1 * | 3/2013 | Wink | | B60P 1/286 |
| | | | | 298/24 |
| 2018/0118288 A1 | 5/2018 | Linn et al. | | |
| 2020/0086935 A1 | 3/2020 | Dandurand | | |

OTHER PUBLICATIONS

Written Opinion dated Mar. 27, 2018 in connection with International Patent Application PCT/CA2017/051567, 6 pages.
Non-Final Office Action dated Feb. 8, 2021, in connection with U.S. Appl. No. 16/046,318, 19 pages.
Ex-party Quayle issued on Aug. 20, 2021, in connection with U.S. Appl. No. 16/046,318, 10 pages.
Notice of Allowance dated Dec. 15, 2021, in connection with U.S. Appl. No. 16/046,318, 7 pages.

* cited by examiner

-- Prior Art --

-- Prior Art --

US 11,932,329 B2

TRACK SYSTEM FOR TRACTION OF A VEHICLE

CROSS-REFERENCE TO RELATED APPLICATION

This International Application claims priority from U.S. Provisional Patent Application No. 62/436,845 filed on Dec. 20, 2016 and hereby incorporated by reference herein.

FIELD

The invention relates generally to track systems for traction of vehicles such as snowmobiles, all-terrain vehicles (ATVs), and other off-road vehicles.

BACKGROUND

Certain vehicles may be equipped with track systems which enhance their traction and floatation on soft, slippery and/or irregular grounds (e.g., snow, ice, soil, mud, sand, etc.) on which they operate.

For example, snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

A snowmobile, including its track system, may face a number of challenges while riding. For example, the track system may generate noise that can be significant (e.g., for a rider and/or the snowmobile's environment), the track may be exposed to factors (e.g., snow conditions, ground unevenness, etc.) that affect its traction and/or floatation and/or cause wear, etc.

Similar considerations may arise for track systems of other types of off-road vehicles (e.g., all-terrain vehicles (ATVs), agricultural vehicles, or other vehicles that travel on uneven grounds) in certain situations.

For these and other reasons, there is a need to improve track systems for traction of vehicles.

SUMMARY

In accordance with various aspects of the invention, there is provided a track system for traction of a vehicle. The track system comprises a track and a track-engaging assembly for driving and guiding the track around the track-engaging assembly. The track system may have features to enhance its traction, floatation, and/or other aspects of its performance, including the track that may comprise reinforcing material (e.g., reinforcing polymeric material) that is stronger (e.g., stiffer, harder, and/or more resistant to wear) than elastomeric material of the track, such as to improve rigidity characteristics of the track, reduce noise generated by the track system, improve a resistance to wear of the track, and/or reduce a weight of the track. The reinforcing material may be provided as one or more thin layers constituting at least part (e.g., of a periphery) of one or more components of the track (e.g., a carcass, traction projections, and/or drive/guide lugs).

For example, in accordance with an aspect, this disclosure relates to a track for traction of a vehicle. The track is mountable around a plurality of wheels. The track comprises a ground-engaging outer surface and an inner surface opposite to the ground-engaging outer surface. The track comprises elastomeric material allowing the track to flex around the wheels and reinforcing material stronger than the elastomeric material and constituting at least part of a periphery of the track.

In accordance with another aspect, this disclosure relates to a track for traction of a vehicle. The track is mountable around a plurality of wheels. The track comprises a ground-engaging outer surface and an inner surface opposite to the ground-engaging outer surface. The track comprises elastomeric material allowing the track to flex around the wheels and ultra-high-molecular-weight polyethylene constituting at least part of a periphery of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
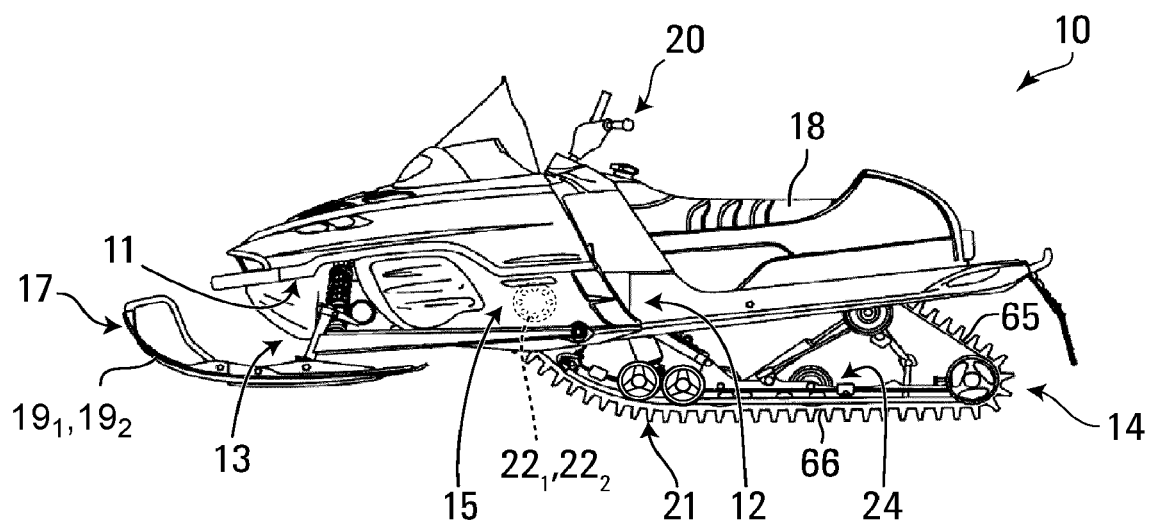
FIG. 1 shows an example of a vehicle comprising a track system in accordance with an embodiment of the invention, in which the vehicle is a snowmobile.

FIG. 1 shows an example of a vehicle 10 comprising a track system 14 in accordance with an embodiment of the invention. In this embodiment, the vehicle 10 is a snowmobile. The snowmobile 10 is designed for travelling on snow and in some cases ice.

The snowmobile 10 comprises a frame 11, a powertrain 12, the track system 14, a ski system 17, a seat 18, and a user interface 20, which enables a user to ride, steer and otherwise control the snowmobile 10. The track system 14 comprises a track 21 to engage the ground for traction of the snowmobile 10.

In various embodiments, as further discussed below, the track system 14, including the track 21, may have features to enhance its traction, floatation, and/or other aspects of its performance, including the track 21 that may comprise reinforcing material (e.g., reinforcing polymeric material) that is stronger (e.g., stiffer, harder, and/or more resistant to wear) than elastomeric material of the track 21, such as to improve rigidity characteristics of the track 21, reduce noise generated by the track system 14, improve a resistance to wear of the track 21, and/or reduce a weight of the track 21.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14. That is, the powertrain 12 transmits motive power from the prime mover 15 to the track system 14 in order to drive (i.e., impart motion to) the track system 14.

The ski system 17 is turnable to allow steering of the snowmobile 10. In this embodiment, the ski system 17 comprises a pair of skis $19_1$, $19_2$ connected to the frame 11 via a ski-supporting assembly 13.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
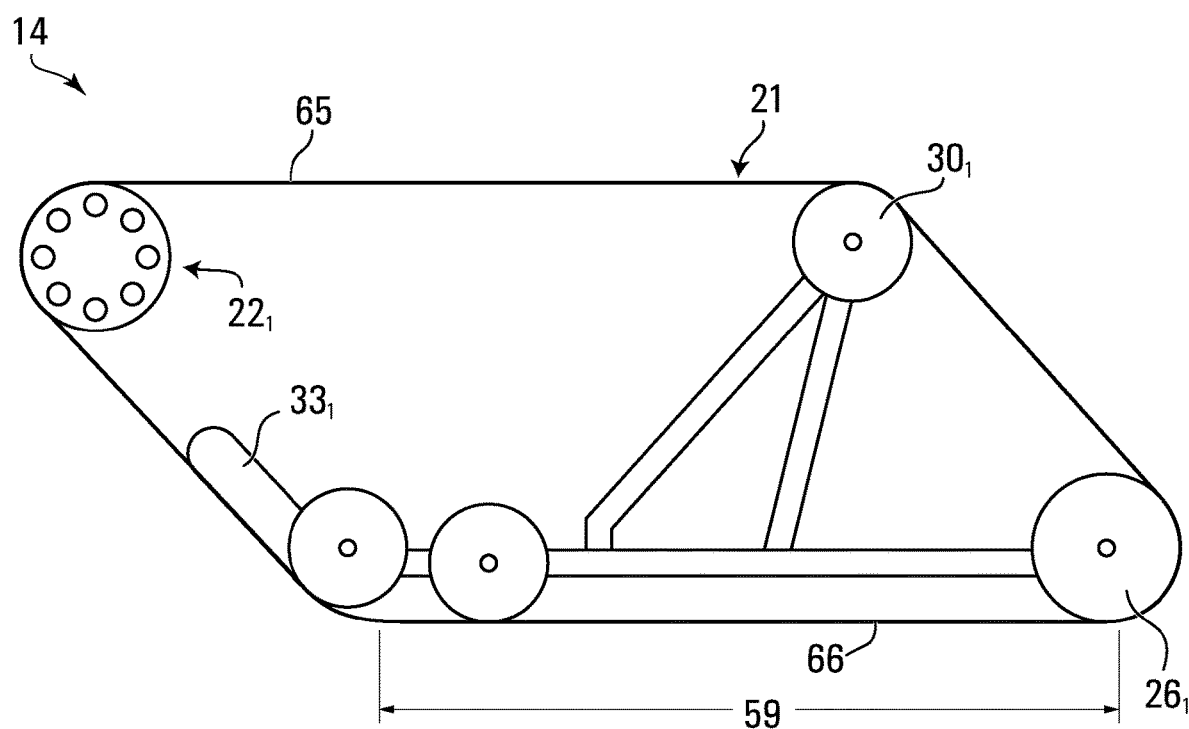
FIG. 2 shows a side view of the track system.
Figure 3:
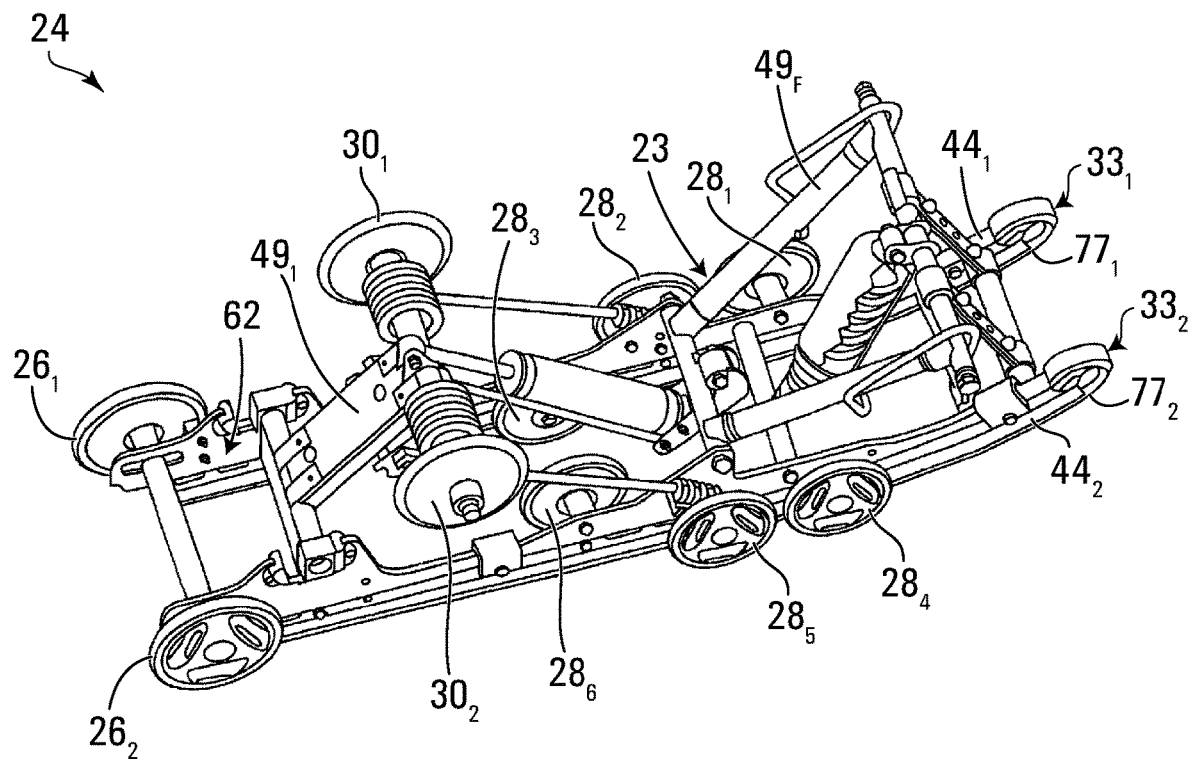
FIG. 3 shows a perspective view of a track-engaging assembly of the track system.
Figure 4:
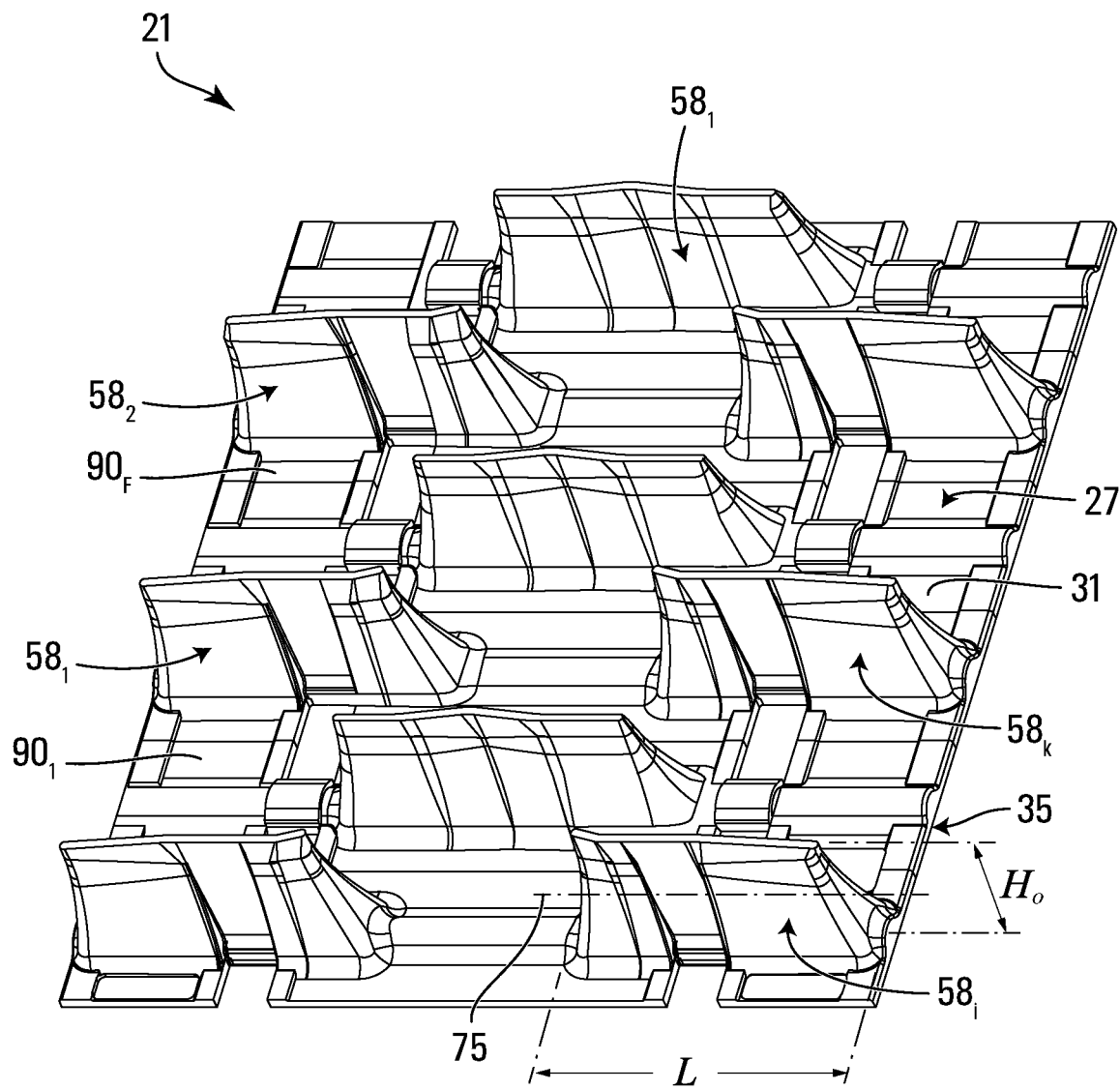
FIGS. 4, 5, 6, and 7 respectively show a perspective view, a plan view, an elevation view, and a longitudinal cross-sectional view of part of a track of the track system.

The track system 14 is configured to engage the ground to generate traction for the snowmobile 10. With additional reference to FIGS. 2 and 3, the track system 14 comprises the track 21 and a track-engaging assembly 24 for driving and guiding the track 21 around the track-engaging assembly 24. More particularly, in this embodiment, the track-engaging assembly 24 comprises a frame 23 and a plurality of track-contacting wheels which includes a plurality of drive wheels $22_1$, $22_2$ and a plurality of idler wheels that includes rear idler wheels $26_1$, $26_2$, lower roller wheels $28_1$-$28_6$, and upper roller wheels $30_1$, $30_2$. As it is disposed between the track 21 and the frame 11 of the snowmobile 10, the track-engaging assembly 24 can be viewed as implementing a suspension for the snowmobile 10. The track system 14 has a longitudinal direction and a first longitudinal end and a second longitudinal end that define a length of the track system 14, a widthwise direction and a width that is defined by a width W of the track 21, and a heightwise direction that is normal to its longitudinal direction and its widthwise direction.

The track 21 is configured to engage the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 4 to 7, the track 21 comprises an inner side 25 for facing the track-engaging assembly 24 and a ground-engaging outer side 27 for engaging the ground. A top run 65 of the track 21 extends between the longitudinal ends of the track system 14 and over the track-engaging assembly 24 (including over the wheels $22_1$, $22_2$, $26_1$, $26_2$, $28_1$-$28_6$, $30_1$, $30_2$), and a bottom run 66 of the track 21 extends between the longitudinal ends of the track system 14 and under the track-engaging assembly 24 (including under the wheels $22_1$, $22_2$, $26_1$, $26_2$, $28_1$-$28_6$, $30_1$, $30_2$). The bottom run 66 of the track 21 defines an area of contact 59 of the track 21 with the ground which generates traction and bears a majority of a load on the track system 14, and which will be referred to as a "contact patch" of the track 21 with the ground. The track 21 has a longitudinal axis 85 which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness direction normal to its longitudinal and widthwise directions.

The track 21 is elastomeric, i.e., comprises elastomeric material 53, to be flexible around the track-engaging assembly 24. The elastomeric material 53 of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material 53 of the track 21 may include another elastomer in addition to or instead of rubber (e.g., polyurethane elastomer).

Figure 8:
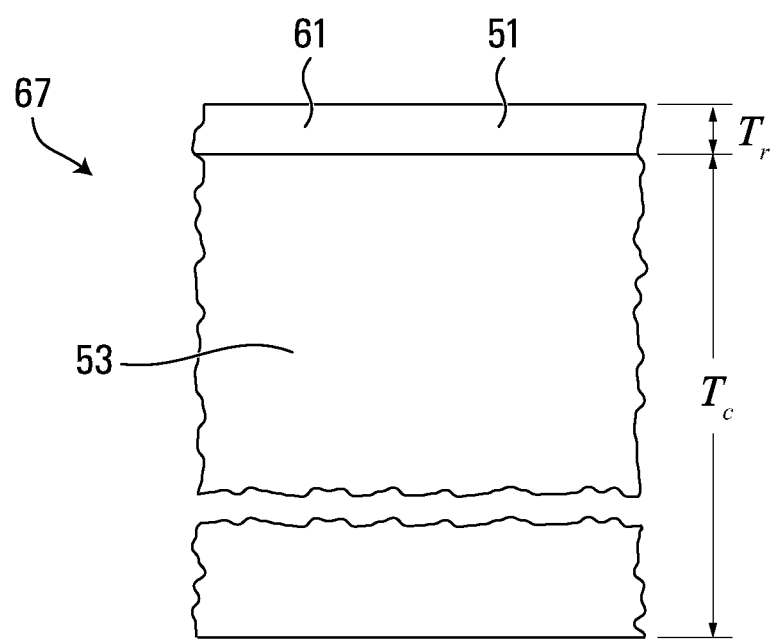
FIG. 8 shows a reinforcing material of the track overlying an elastomeric material of the track.

In this embodiment, as further discussed later, as shown in FIG. 8, the track 21 also comprises reinforcing material 51 (e.g., reinforcing polymeric material) that is significantly stronger (e.g., stiffer, harder, and/or more resistant to wear) than the elastomeric material 53. This may enhance various aspects of the track system 14, such as, for example, by improving the rigidity characteristics of the track 21, reducing the noise generated by the track system 14, improving the resistance to wear of the track 21, and/or reducing the weight of the track 21.

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38, which is part of the elastomeric material 53 of the track 21, can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 9A:
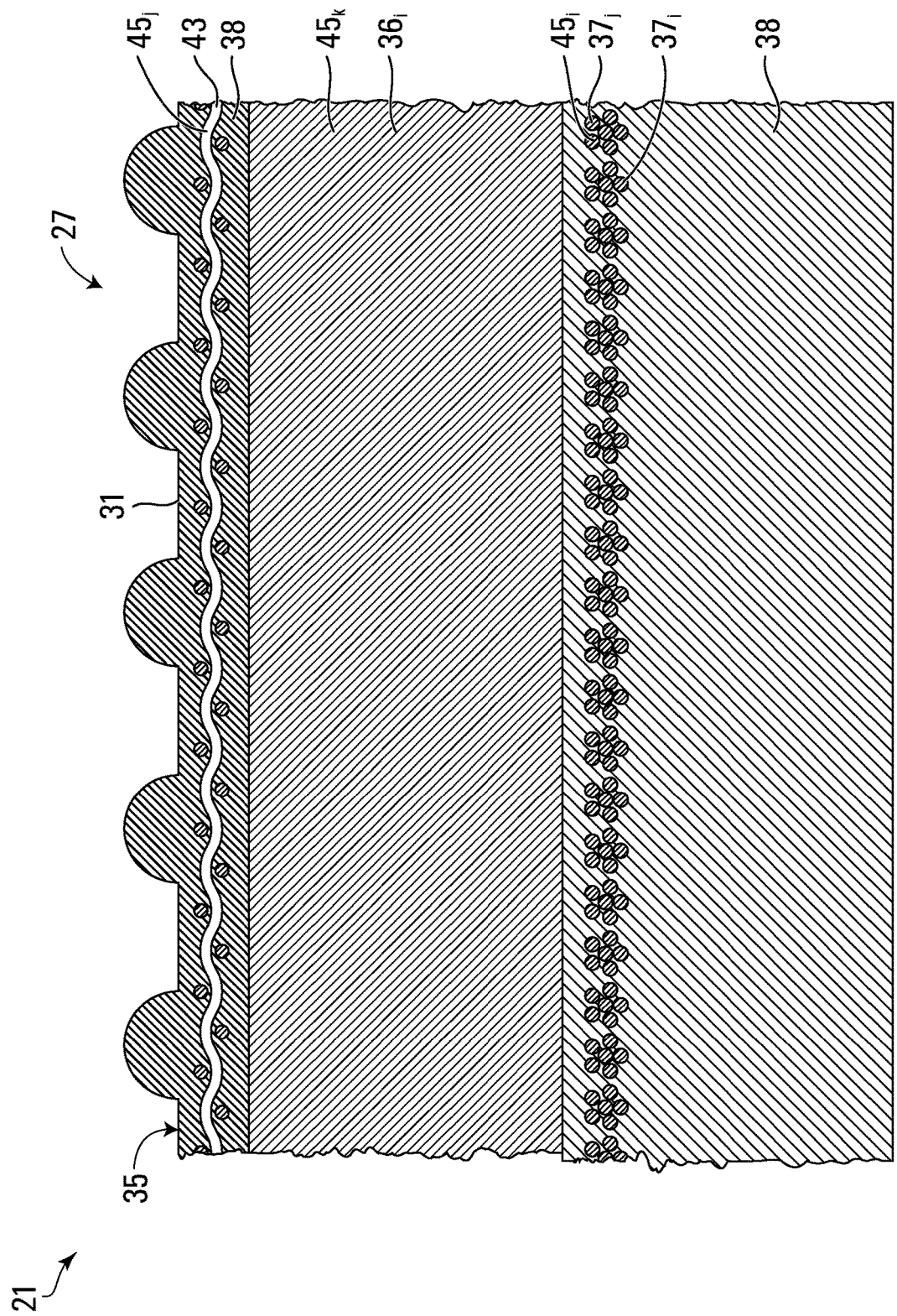
FIG. 9A shows a widthwise cross-sectional view of part of the track.
Figure 9B:
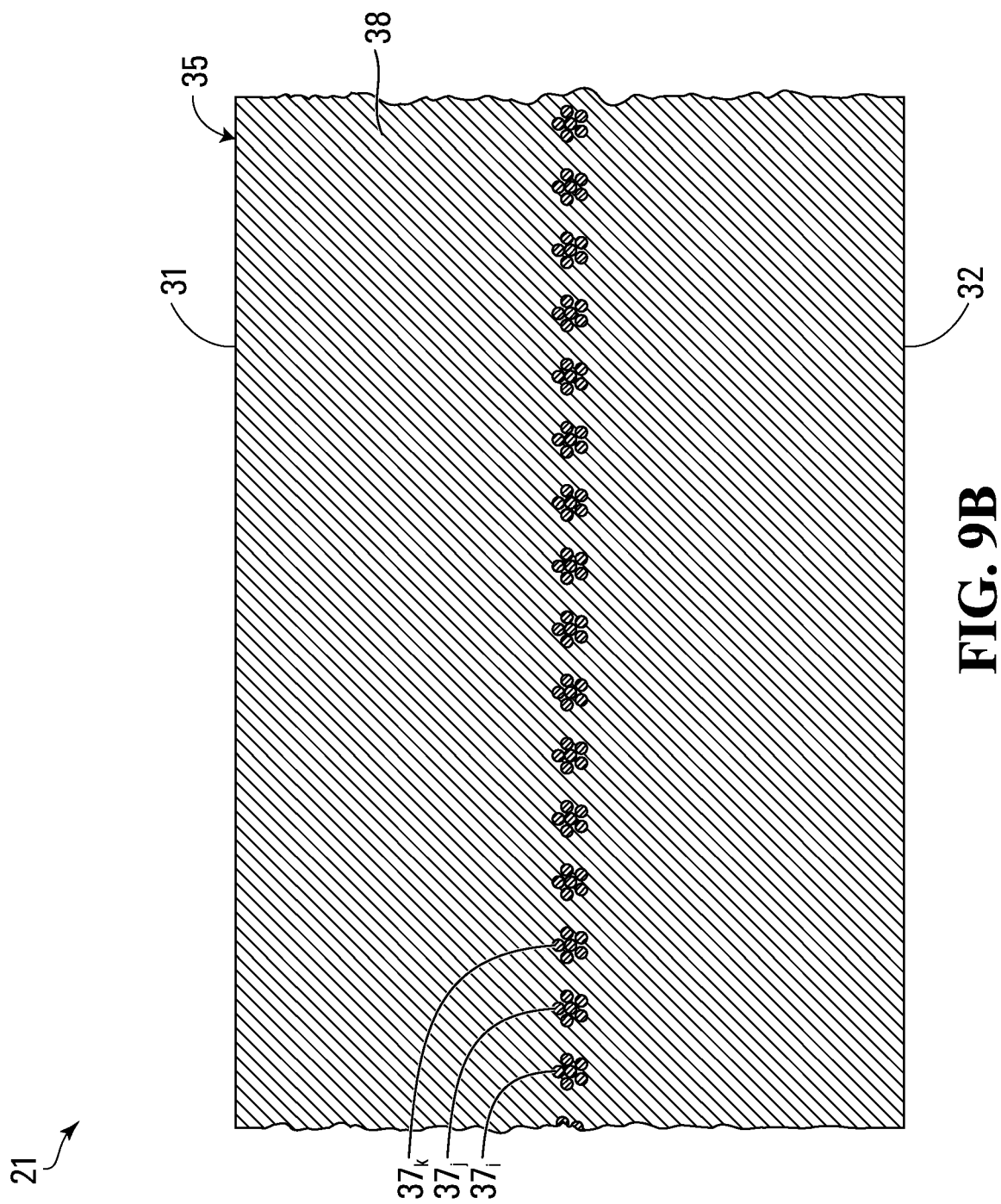
FIG. 9B shows a widthwise cross-sectional view of part of the track in accordance to another embodiment.

In this embodiment, as shown in FIGS. 9A and 9B, the carcass 35 comprises a plurality of reinforcements $45_1$-$45_P$ embedded in its rubber 38. These reinforcements $45_1$-$45_P$ can take on various forms.

For example, in this embodiment, a subset of the reinforcements $45_1$-$45_P$ is a plurality of transversal stiffening rods $36_1$-$36_N$ that extend transversally to the longitudinal direction of the track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the reinforcements $45_i$, $45_j$ are reinforcing layers that are flexible in the longitudinal direction of the track 21.

For instance, in this embodiment, the reinforcement $45_i$ is a layer of reinforcing cables $37_1$-$37_M$ that are adjacent to one another and extend generally in the longitudinal direction of the track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material). In some examples of implementation, respective ones of the reinforcing cables $37_1$-$37_M$ may be constituted by a single continuous cable length wound helically around the track 21. In other examples of implementation, respective ones of the transversal cables $37_1$-$37_M$ may be separate and independent from one another (i.e., unconnected other than by rubber of the track 21).

Also, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

In some embodiments, as shown in FIG. 9B, the carcass 35 may comprise only one type of reinforcement (e.g., the reinforcing cables $37_1$-$37_M$) or any other selected combination of the above-mentioned reinforcements $45_1$-$45_P$.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

The ground-engaging outer side 27 of the track 21 comprises a ground-engaging outer surface 31 of the carcass 35 and a plurality of traction projections $58_1$-$58_T$ that project from the ground-engaging outer surface 31 to enhance traction on the ground. The traction projections $58_1$-$58_T$, which can be referred to as "traction lugs" or "traction profiles", may have any suitable shape (e.g., straight shapes, curved shapes, shapes with straight parts and curved parts, etc.).

A height $H_o$ of a traction projection $58_x$ may have any suitable value. For example, in some embodiments, the height $H_o$ of the traction projection $58_x$ may be at least 2 inches, in some cases at least 4 inches, in some cases at least 6 inches, and in some cases even more. The height of the traction projection $58_x$ may have any other suitable value in other embodiments. The traction projection $58_x$ also has a longitudinal axis 75 and a first longitudinal end $308_1$ and a second longitudinal end $308_2$ that define a length L of the traction projection $58_x$. The longitudinal axis 75 of the traction projection $58_x$ extends transversally to the longitudinal direction of the track 21, in this example in the widthwise direction of the track 21.

In this embodiment, each of the traction projections $58_1$-$58_T$ is an elastomeric traction projection in that it comprises elastomeric material 41. The elastomeric material 41, which is part of the elastomeric material 53 of the track 21, can be any polymeric material with suitable elasticity. More particularly, in this embodiment, the elastomeric material 41 includes rubber. Various rubber compounds may be used and, in some cases, different rubber compounds may be present in different areas of each of the traction projections $58_1$-$58_T$. In other embodiments, the elastomeric material 41 may include another elastomer in addition to or instead of rubber (e.g., polyurethane elastomer).

The traction projections $58_1$-$58_T$ may be provided on the ground-engaging outer side 27 in various ways. For example, in this embodiment, the traction projections $58_1$-$58_T$ are provided on the ground-engaging outer side 27 by being molded with the carcass 35.

The inner side 25 of the track 21 comprises an inner surface 32 of the carcass 35 and a plurality of inner projections $34_1$-$34_D$ that project from the inner surface 32 and are positioned to contact the track-engaging assembly 24 (e.g., at least some of the wheels $22_1$, $22_2$, $26_1$, $26_2$, $28_1$-$28_6$, $30_1$, $30_2$) to do at least one of driving (i.e., imparting motion to) the track 21 and guiding the track 21. Since each of them is used to do at least one of driving the track 21 and guiding the track 21, the inner projections $34_1$-$34_D$ can be referred to as "drive/guide projections" or "drive/guide lugs". In some cases, a drive/guide lug $34_i$ may interact with a given one of the drive wheels $22_1$, $22_2$ to drive the track 21, in which case the drive/guide lug $34_i$ is a drive lug. In other cases, a drive/guide lug $34_i$ may interact with a given one of the idler wheels $26_1$, $26_2$, $28_1$-$28_2$, $30_1$, $30_2$ and/or another part of the track-engaging assembly 24 to guide the track 21 to maintain proper track alignment and prevent de-tracking without being used to drive the track 21, in which case the drive/guide lug $34_i$ is a guide lug. In yet other cases, a drive/guide lug $34_i$ may both (i) interact with a given one of the drive wheels $22_1$, $22_3$ to drive the track 21 and (ii) interact with a given one of the idler wheels $26_1$, $26_2$, $28_1$-$28_6$, $30_1$, $30_2$ and/or another part of the track-engaging assembly 24 to guide the track 21, in which case the drive/guide lug $34_i$ is both a drive lug and a guide lug. A height $H_l$ of a drive/guide lug $34_x$ may have any suitable value.

In this embodiment, each of the drive/guide lugs $34_1$-$34_D$ is an elastomeric drive/guide lug in that it comprises elastomeric material 42. The elastomeric material 42, which is part of the elastomeric material 53 of the track 21, can be any polymeric material with suitable elasticity. More particularly, in this embodiment, the elastomeric material 42 includes rubber. Various rubber compounds may be used and, in some cases, different rubber compounds may be present in different areas of each of the drive/guide lugs $34_1$-$34_D$. In other embodiments, the elastomeric material 42 may include another elastomer in addition to or instead of rubber (e.g., polyurethane elastomer).

The drive/guide lugs $34_1$-$34_D$ may be provided on the inner side 25 in various ways. For example, in this embodiment, the drive/guide lugs $34_1$-$34_D$ are provided on the inner side 25 by being molded with the carcass 35.

In this embodiment, the carcass 35 has a thickness T, which is relatively small. The thickness $T_c$ of the carcass 35 is measured from the inner surface 32 to the ground-engaging outer surface 31 of the carcass 35 between longitudinally-adjacent ones of the traction projections $58_1$-$58_T$. For example, in some embodiments, the thickness $T_c$ of the carcass 35 may be no more than 0.25 inches, in some cases no more than 0.22 inches, in some cases no more than 0.20 inches, and in some cases even less (e.g., no more than 0.18 or 0.16 inches). The thickness $T_c$ of the carcass 35 may have any other suitable value in other embodiments.

The track-engaging assembly 24 is configured to drive and guide the track 21 around the track-engaging assembly 24.

Each of the drive wheels $22_1$, $22_2$ is rotatable by an axle for driving the track 21. That is, power generated by the prime mover 15 and delivered over the powertrain 12 of the snowmobile 10 rotates the axle, which rotates the drive wheels $22_1$, $22_2$, which impart motion of the track 21. In this embodiment, each drive wheel $22_i$ comprises a drive sprocket engaging some of the drive/guide lugs $34_1$-$34_D$ of the inner side 25 of the track 21 in order to drive the track 21. In other embodiments, the drive wheel $22_i$ may be configured in various other ways. For example, in embodiments where the track 21 comprises drive holes, the drive wheel $22_i$ may have teeth that enter these holes in order to drive the track 21. As yet another example, in some embodiments, the drive wheel $22_i$ may frictionally engage the inner side 25 of the track 21 in order to frictionally drive the track 21. The drive wheels $22_1$, $22_2$ may be arranged in other configurations and/or the track system 14 may comprise more or less drive wheels (e.g., a single drive wheel, more than two drive wheels, etc.) in other embodiments.

The idler wheels $26_1$, $26_2$, $28_1$-$28_6$, $30_1$, $30_2$ are not driven by power supplied by the prime mover 15, but are rather used to do at least one of guiding the track 21 as it is driven by the drive wheels $22_1$, $22_2$, tensioning the track 21, and supporting part of the weight of the snowmobile 10 on the ground via the track 21. More particularly, in this embodiment, the rear idler wheels $26_1$, $26_2$ are trailing idler wheels that maintain the track 21 in tension, guide the track 21 as it wraps around them, and can help to support part of the weight of the snowmobile 10 on the ground via the track 21. The lower roller wheels $28_1$-$28_6$ roll on the inner side 25 of the track 21 along the bottom run 66 of the track 21 to apply the bottom run 66 on the ground. The upper roller wheels $30_1$, $30_2$ roll on the inner side 25 of the track 21 along the top run 65 of the track 21 to support and guide the top run 65 as the track 21 moves. The idler wheels $26_1$, $26_2$, $28_1$-$28_6$, $30_1$, $30_2$ may be arranged in other configurations and/or the track assembly 14 may comprise more or less idler wheels in other embodiments.

The frame 23 of the track system 14 supports various components of the track-engaging assembly 24, including, in this embodiment, the idler wheels $26_1$, $26_2$, $28_1$-$28_6$, $30_1$, $30_2$. More particularly, in this embodiment, the frame 23 comprises an elongate support 62 extending in the longitudinal direction of the track system 14 along the bottom run 66 of the track 21 and frame members $49_1$-$49_F$ extending upwardly from the elongate support 62.

Figure 5:
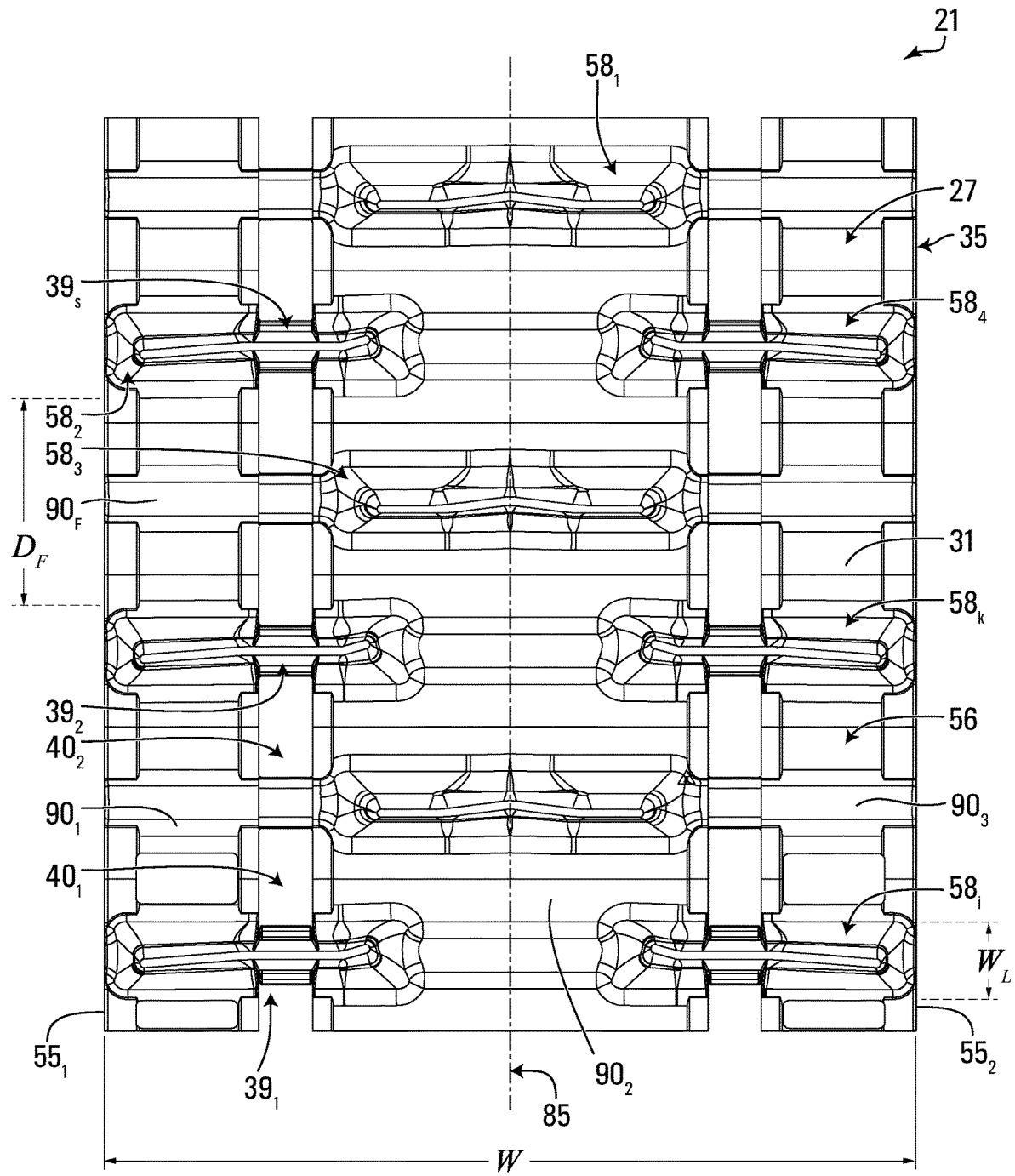
Figure 6:
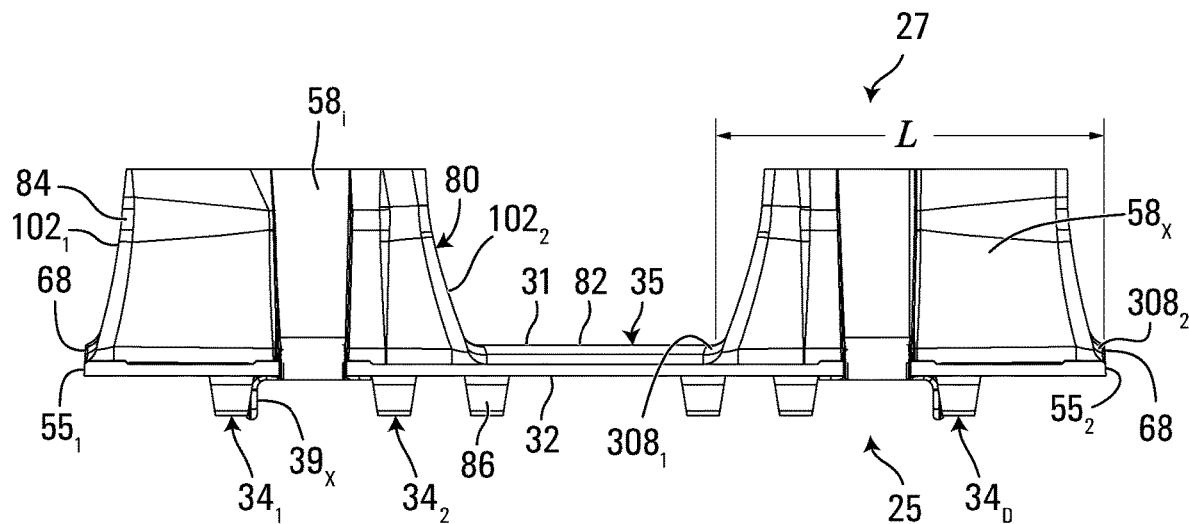
Figure 7:
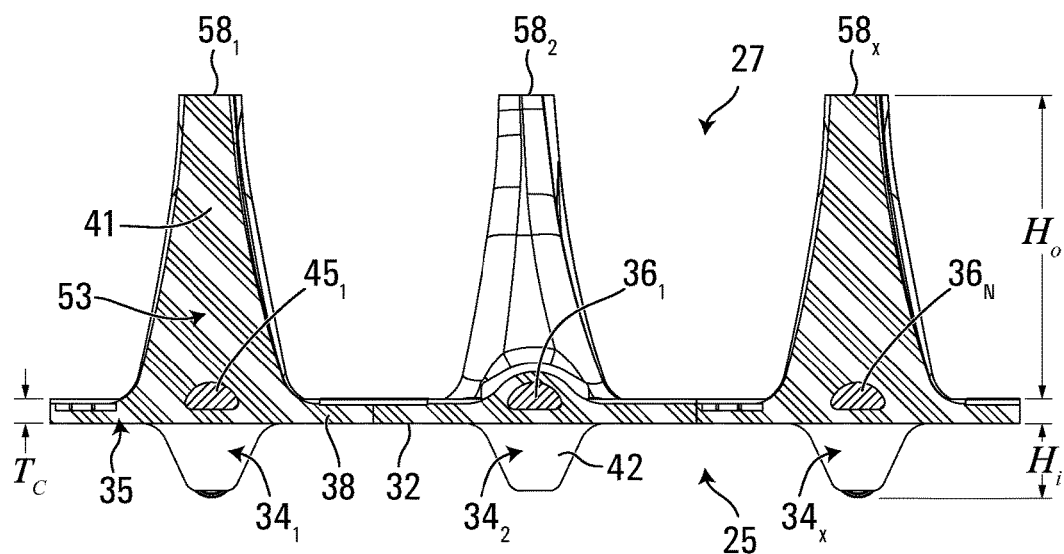

The elongate support 62 comprises rails $44_1$, $44_2$ extending in the longitudinal direction of the track system 14 along the bottom run 66 of the track 21. In this example, the idler wheels $26_1$, $26_2$, $28_1$-$28_6$ are mounted to the rails $44_1$, $44_2$. In this embodiment, the elongate support 62 comprises sliding surfaces $77_1$, $77_2$ for sliding on the inner side 25 of the track 21 along the bottom run 66 of the track 21. Thus, in this embodiment, the idler wheels $26_1$, $26_2$, $28_1$-$28_6$ and the sliding surfaces $77_1$, $77_2$ of the elongate support 62 can contact the bottom run 66 of the track 21 to guide the track 21 and apply it onto the ground for traction. In this example, the sliding surfaces $77_1$, $77_2$ can slide against the inner surface 32 of the carcass 35 and can contact respective ones of the drive/guide lugs $34_1$-$34_D$ to guide the track 21 in motion. Also, in this example, the sliding surfaces $77_1$, $77_2$ are curved upwardly in a front region of the track system 14 to guide the track 21 towards the drive wheels $22_1$, $22_2$. In some cases, as shown in FIGS. 5 and 6, the track 21 may comprise slide members $39_1$-$39_S$ that slide against the sliding surfaces $77_1$, $77_2$ to reduce friction. The slide members $39_1$-$39_S$, which can sometimes be referred to as "clips", may be mounted via holes (i.e., windows) $40_1$-$40_H$ of the track 21. In other cases, the track 21 may be free of such slide members.

In this embodiment, the elongate support 62 comprises sliders $33_1$, $33_2$ mounted to respective ones of the rails $44_1$, $44_2$ and comprising respective ones of the sliding surfaces $77_1$, $77_2$. In this embodiment, the sliders $33_1$, $33_2$ are mechanically interlocked with the rails $44_1$, $44_2$. In other embodiments, instead of or in addition to being mechanically interlocked with the rails $44_1$, $44_2$, the sliders $33_1$, $33_2$ may be fastened to the rails $44_1$, $44_2$. For example, in some embodiments, the sliders $33_1$, $33_2$ may be fastened to the rails $44_1$, $44_2$ by one or more mechanical fasteners (e.g., bolts, screws, etc.), by an adhesive, and/or by any other suitable fastener.

In some examples, each slider $33_i$ may comprise a low-friction material which may reduce friction between its sliding surface $77_i$ and the inner side 25 of the track 21. For instance, the slider $33_i$ may comprise a polymeric material having a low coefficient of friction with the rubber of the track 21. For example, in some embodiments, the slider $33_i$ may comprise a thermoplastic material (e.g., a Hifax® polypropylene). The slider $33_i$ may comprise any other suitable material in other embodiments. For instance, in some embodiments, the sliding surface $77_i$ of the slider $33_i$ may comprise a coating (e.g., a polytetrafluoroethylene (PTFE) coating) that reduces friction between it and the inner side 25 of the track 21, while a remainder of the slider $33_i$ may comprise any suitable material (e.g., a metallic material, another polymeric material, etc.).

While in embodiments considered above the sliding surface $77_i$ is part of the slider $33_i$ which is separate from and mounted to each rail $44_i$, in other embodiments, the sliding surface $77_i$ may be part of the rail $44_i$. That is, the sliding surface $77_i$ may be integrally formed (e.g., molded, cast, or machined) as part of the rail $44_i$.

The frame members $49_1$-$49_F$ extend upwardly from the elongate support 62 to hold the upper roller wheels $30_1$, $30_2$ such that the upper roller wheels $30_1$, $30_2$ roll on the inner side 25 of the track 21 along the top run 65 of the track 21.

The track-engaging assembly 24 may be implemented in any other suitable way in other embodiments.

The reinforcing material 51 of the track 21, which is significantly stronger (e.g., stiffer, harder, and/or more resistant to wear) than the elastomeric material 53 of the track 21, may be useful for various purposes. For example, in some embodiments, the reinforcing material 51 may improve the rigidity characteristics of the track 21, reduce the noise generated by the track system 14, improve the resistance to wear of the track 21, and/or reduce the weight of the track 21.

In various embodiments, the reinforcing material 51 of the track 21 may constitute at least part of one or more components of the track 21, such as the carcass 35, the traction projections $58_1$-$58_T$ and/or the drive/guide lugs $34_1$-$34_D$. For example, in some embodiments, the reinforcing material 51 of the track 21 may constitute at least part of a periphery 80 of the track 21, such as at least part of a periphery 82 of the carcass 35, a periphery 84 of a traction projection $58_x$ and/or a periphery 86 of a drive/guide lug $34_x$.

The reinforcing material 51 of the track 21 has a continuous material structure and is therefore not reinforcing fabric (e.g., such as the reinforcing fabric 43) or reinforcing cables (e.g., such as the reinforcing cables $37_1$-$37_M$).

More particularly, in various embodiments, the reinforcing material 51 of the track 21 may comprise a layer of reinforcing material 61 contiguous to (e.g., overlying) the elastomeric material 53 of a given component 67 of the track 21 (e.g., the carcass 35, a traction projection $58_x$ or a drive/guide lug $34_x$). The layer of reinforcing material 61 may be thin, notably significantly thinner than the elastomeric material 53 of the given component 67 of the track 21. For example, in some embodiments, a ratio of a thickness $T_r$ of the layer of reinforcing material 61 over a thickness $T_e$ of the elastomeric material 53 of the given component 67 of the track 21 may be no more than 0.1, in some cases no more than 0.075, in some cases no more than 0.05, in some cases no more than 0.025, in some cases no more than 0.01, and in some cases even less. For instance, in some embodiments, the thickness $T_r$ of the layer of reinforcing material 61 may be no more than 0.02 inches, in some cases no more than 0.015 inches, in some cases no more than 0.012 inches, in some cases no more than 0.01 inches, in some cases no more than 0.005 inches, and in some cases even less. The layer of reinforcing material 61 may thus include a sheet (e.g., a film or other thin sheet) of the reinforcing material 51.

The reinforcing material 51 of the track 21 may be significantly stronger than the elastomeric material 53 of the track 21 in various ways. For example, in some embodiments:

The reinforcing material 51 may be stiffer than the elastomeric material 53. For instance, in some embodiments, a ratio of a modulus of elasticity (i.e., Young's modulus) of the reinforcing material 51 over a modulus of elasticity of the elastomeric material 53 may be at least 10, in some cases at least 50, in some cases at least 80, in some cases at least 100, in some cases at least 120 and in some cases even more. For example, in some embodiments, the modulus of elasticity of the reinforcing material 51 may be at least 80 MPa, in some cases at least 200 MPa, in some cases at least 500 MPa, in some cases at least 800 MPa, in some cases at least 1000 MPa and in some cases even more;

The reinforcing material 51 may be harder than the elastomeric material 53. For instance, in some embodiments, a ratio of a hardness (e.g., on a Shore D scale) of the reinforcing material 51 over a hardness of the elastomeric material 53 may be at least 1.2, in some cases at least 1.5, in some cases at least 2, in some cases at least 2.5 and in some cases even more. For example, in some embodiments, the hardness of the reinforcing material 51 may be at least 40 Shore D, in some cases at least 50 Shore D, in some cases at least 60 Shore D, in some cases at least 70 Shore D, in some cases at least 80 Shore D and in some cases even more; and/or The reinforcing material 51 may be more resistant to wear (e.g., abrasion) than the elastomeric material 53. For instance, in some embodiments, a ratio of a wear resistance of the reinforcing material 51 over a wear resistance of the elastomeric material 53 may be no more than 0.95, in some cases no more than 0.8, in some cases no more than 0.7, in some cases no more than 0.6, in some cases no more than 0.5 and in some cases even less. The wear resistance of the reinforcing material 51 can be taken as an abrasion resistance of the reinforcing material 51 and the wear resistance of the elastomeric material 53 can be taken as an abrasion resistance of the elastomeric material 53. For example, the wear resistance of each of the reinforcing material 51 and the elastomeric material 53, expressed as its abrasion resistance, may be measured under ASTM D-5963 conditions (e.g., sample dimensions; loading conditions; etc.). For instance, in some embodiments, the abrasion resistance of the reinforcing material 51 may be at least 40 $mm^3$, in some cases at least 60 $mm^3$, in some cases at least 80 $mm^3$, in some cases at least 100 $mm^3$, in some cases at least 120 $mm^3$, in some cases at least 150 $mm^3$ and in some cases even more.

In this embodiment, the reinforcing material 51 is reinforcing polymeric material. For example, in some embodiments, the reinforcing polymeric material 51 may be non-elastomeric (i.e., not be an elastomer). In some cases, the reinforcing polymeric material 51 may comprise thermoplastic material. For instance, in some embodiments, the reinforcing polymeric material 51 may comprise ultra-high-molecular-weight polyethylene (UHMW or UHMWPE). The reinforcing polymeric material 51 may comprise any other suitable polymer in other embodiments, such as polyethylene (PE) (e.g., low-density polyethylene (LDPE) or high-density polyethylene (HDPE)), polypropylene (PP), polytetrafluoroethylene (PTFE), a thermoplastic elastomer (TPE) such as thermoplastic polyurethane (TPU), polyether ether ketone (PEEK) or other polyaryletherketone (PAEK), polycarbonate, nylon or other polyamide, etc.

In some examples of implementation, the reinforcing polymeric material 51 may be a composite material. For instance, the reinforcing polymeric material 51 may be a fiber-matrix composite material that comprises a polymeric matrix in which fibers are embedded (i.e., a fiber-reinforced polymeric material). The polymeric matrix may include any suitable polymeric resin (e.g., a thermoplastic or thermosetting resin, such as epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin. The fibers may be made of any suitable material (e.g., carbon fibers, aramid fibers (e.g., Kevlar fibers), boron fibers, silicon carbide fibers, etc.).

Examples of embodiments in which the reinforcing polymeric material 51 of the track 21 may be provided in various ways will now be discussed.

1. Carcass's Periphery

In some embodiments, the reinforcing polymeric material 51 of the track 21 may constitute at least part of the periphery 82 of the carcass 35, such as at least part of the inner surface 32 and/or at least part of the ground-engaging outer surface 31 of the carcass 35. This may improve rigidity characteristics of the carcass 35 and thus those of the track 21, reduce the noise generated by the track system 14, improve a resistance to wear of the carcass 35, and/or reduce a weight of the carcass 35 and thus the weight of the track 21.

Figure 10:
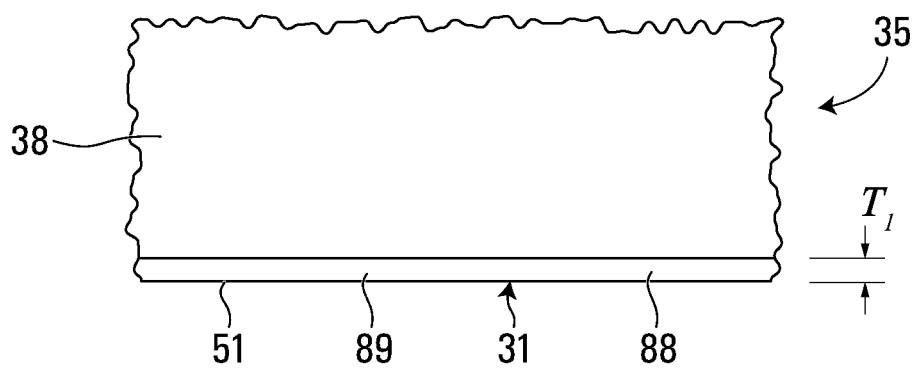
FIGS. 10 shows a layer of reinforcing polymeric material of the reinforcing material of the track constituting at least part of a ground-engaging outer surface of a carcass of the track.

For example, in some embodiments, as shown in FIG. 10, the reinforcing polymeric material 51 may comprise a layer of reinforcing polymeric material 88 constituting at least part of the ground-engaging outer surface 31 of the carcass 35.

Where the layer of reinforcing polymeric material 88 is stiffer than the elastomeric material 38 of the carcass 35, this may help to increase a longitudinal rigidity of the carcass 35, i.e., a rigidity of the carcass 35 in the longitudinal direction of the track 21 which refers to the carcass's resistance to bending about an axis parallel to the widthwise direction of the track 21, and/or (2) a widthwise rigidity of the carcass 35, i.e., a rigidity of the carcass 35 in the widthwise direction of the track 21 which refers to the carcass's resistance to bending about an axis parallel to the longitudinal direction of the track 21.

Increasing the widthwise rigidity of the carcass 35 may help to improve traction and floatation.

Increasing the longitudinal rigidity of the carcass 35 may help to reduce noise generated by the track system 14, such as in cases where the carcass 35 comprises the transversal stiffening rods $36_1$-$36_N$ by reducing a difference in rigidity between areas which have the transversal stiffening rods $36_1$-$36_N$ and areas that do not have the transversal stiffening rods $36_1$-$36_N$ when the roller wheels $28_1$-$28_6$, $30_1$, $30_2$ pass over these areas. In other words, the increased longitudinal rigidty of the carcass 35 may reduce deformation of the carcass 35 against impacts such as when the roller wheels $28_1$-$28_6$, $30_1$, $30_2$ roll over the carcass 35. This in turn may cause a reduction in noise generated by the track system 14.

Figure 40:
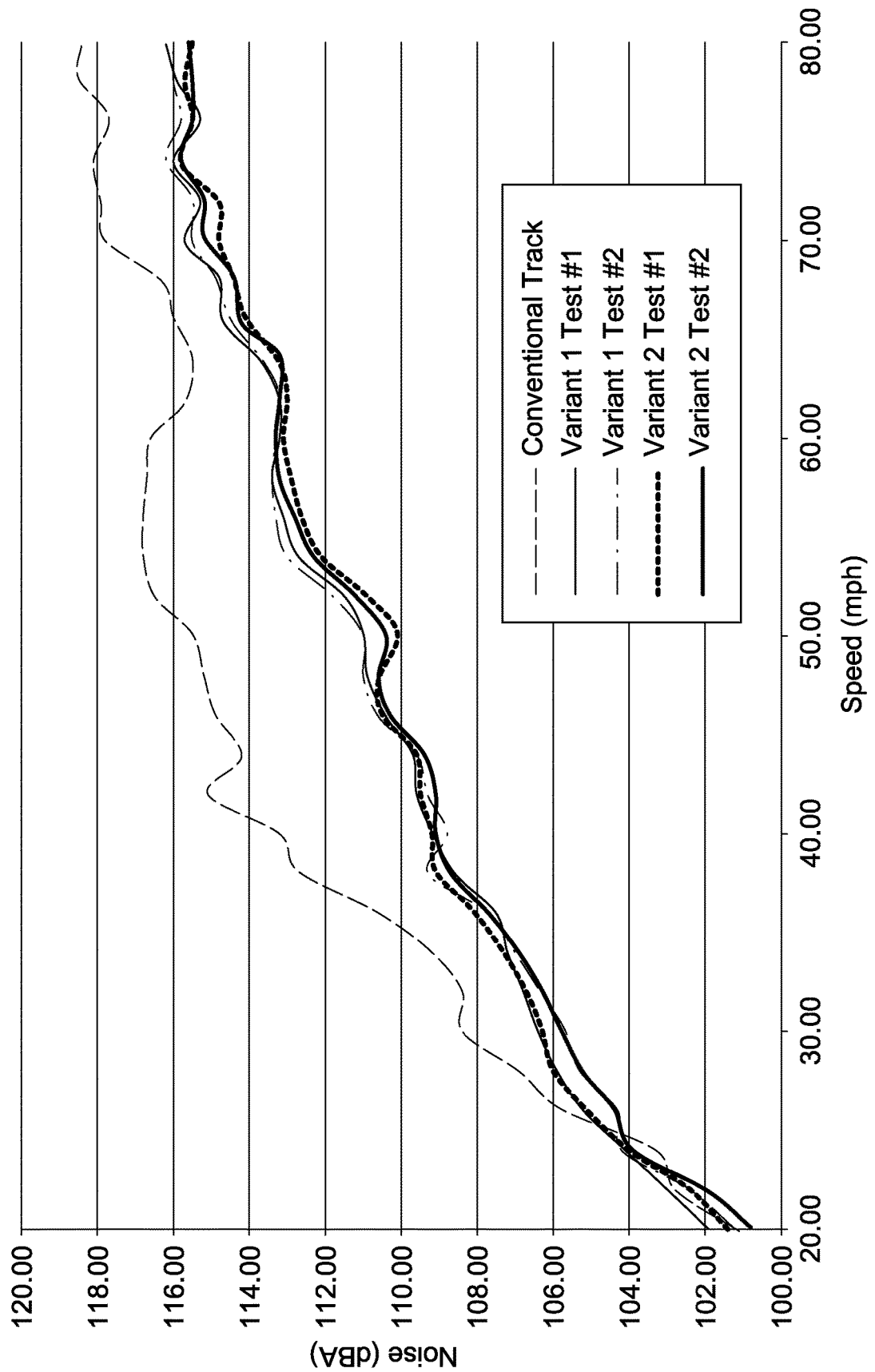
FIG. 40 shows a graph of test data evaluating noise generated at given speeds by a conventional track compared to the track of FIG. 10.

For instance, in some embodiments, the track 21 may generate less noise than if the layer of reinforcing polymeric material 88 was omitted but the track 21 was otherwise identical. More specifically, tests have been performed to compare the noise generated by a conventional track (i.e., a track without the layer of polymeric reinforcing material 88 but otherwise identical to the track 21) to the noise generated by two variants of the track 21 which include the layer of reinforcing polymeric material 88. As shown in FIG. 40, test data indicates that at a vehicle speed of approximately 27 mph and above, the noise generated by the track 21 (i.e., with the layer of reinforcing polymeric material 88) is less than the noise generated by the conventional track at the same vehicle speed. More particularly, in the vehicle speed range between 38 mph and 60 mph, the noise generated by the track 21 is over 3% less than the noise generated by the conventional track. For instance, the noise generated by the track 21 in this vehicle speed range may be between 3% and 6% less than the noise generated by the conventional track at a similar vehicle speed range.

Where the layer of reinforcing polymeric material 88 is more resistant to wear (e.g., abrasion and/or tearing) than the elastomeric material 38 of the carcass 35, this may help to protect the carcass 35 and reduce wear of the carcass 35 as the track 21 travels on the ground.

This may also help to reduce the thickness $T_c$ of the carcass 35, such as by using less of the elastomeric material 38 of the carcass 35. In turn, this may reduce the weight of the carcass 35 and, thus, the weight of the track 21. For example, in some embodiments, the thickness $T_c$ of the carcass 35 may be no more than 0.2 inches, in some cases no more than 0.018 inches, in some cases no more than 0.016 inches, in some cases no more than 0.014 inches, in some cases no more than 0.012 inches and in some cases even less.

In this embodiment, the layer of reinforcing polymeric material 88 occupies at least a substantial part of each of a plurality of traction-projection-free areas $90_1$-$90_F$ of the ground-engaging outer surface 31, i.e., areas of the ground-engaging outer surface 31 that are disposed between respective ones of the traction projections $58_1$-$58_T$ and that are free of traction projections. For instance, the layer of reinforcing polymeric material 88 may occupy at least a majority (i.e., a majority or an entirety) of the width W of the track 21. More specifically, in this embodiment, the layer of reinforcing polymeric material 88 occupies the entirety of the width W of the track 21. Moreover, the layer of reinforcing polymeric material 88 may occupy at least a majority (i.e., a majority or an entirety) of a dimension $D_F$ of a traction-projection-free area $90_t$ in the longitudinal direction of the track 21. In this embodiment, the layer of reinforcing polymeric material 88 occupies the entirety of the dimension $D_F$.

Furthermore, in this embodiment, the layer of reinforcing polymeric material 88 is thin. For instance, in this embodiment, a thickness $T_1$ of the layer of reinforcing polymeric material 88 is less than the thickness $T_c$ of the carcass 35. For example, in some cases, a ratio of the thickness $T_1$ of the layer of reinforcing polymeric material 88 over the thickness $T_c$ of the carcass 35 may be no more than 0.15, in some cases no more than 0.1, in some cases no more than 0.05, and in some cases even less (e.g., 0.02).

Figure 11:
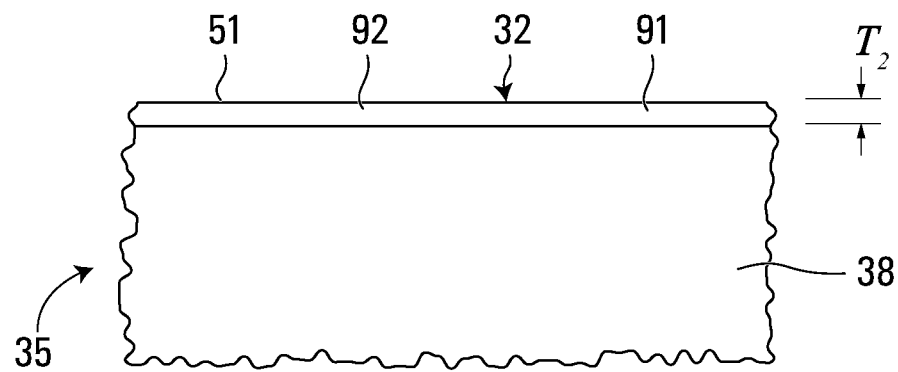
FIG. 11 shows a layer of reinforcing polymeric material of the reinforcing material of the track constituting at least part of an inner surface of the carcass of the track.

As another example, as shown in FIG. 11, the reinforcing polymeric material 51 may comprise a layer of reinforcing polymeric material 92 constituting at least part of the inner surface 32 of the carcass 35.

This may have similar effects as described above in respect of the layer of reinforcing polymeric material 88 constituting at least part of the ground-engaging outer surface 31 of the carcass 35.

In this embodiment, the layer of reinforcing polymeric material 92 may occupy at least a majority (i.e., a majority or an entirety) of the width W of the track 21. More specifically, in this embodiment, the layer of reinforcing polymeric material 92 occupies the entirety of the width W of the track 21.

Furthermore, in this embodiment, the layer of reinforcing polymeric material 92 is thin. For instance, a thickness $T_2$ of the layer of reinforcing polymeric material 92 is less than the thickness $T_c$ of the carcass 35. For example, in some cases, a ratio of the thickness $T_2$ of layer of reinforcing polymeric material 92 over the thickness $T_c$ of the carcass 35 may be no more than 0.15, in some cases no more than 0.1, in some cases no more than 0.05 and in some cases even less (e.g., 0.02).

Figure 12:
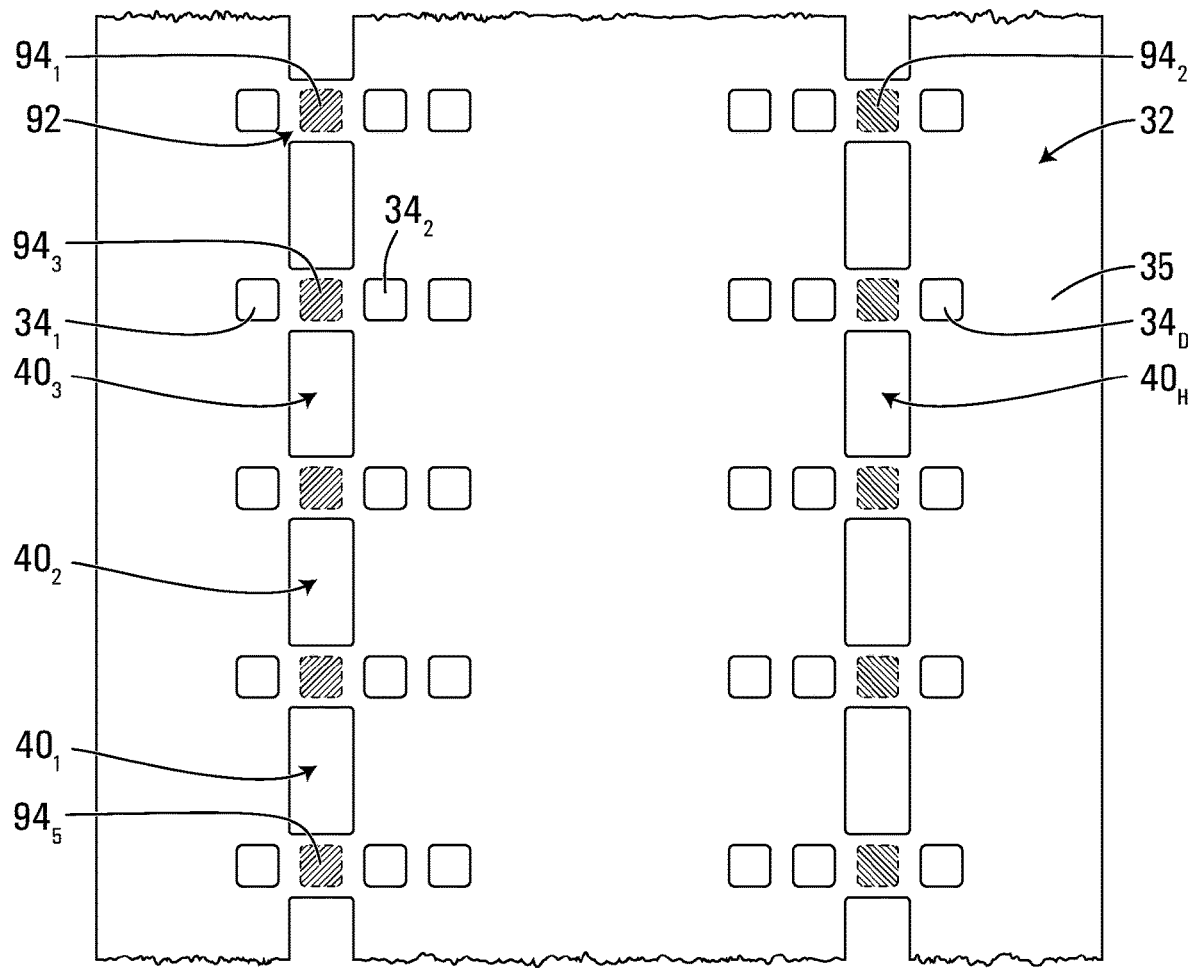
FIG. 12 shows the layer of reinforcing polymeric material of FIG. 11 in accordance with an embodiment in which it includes a plurality of segments that are spaced apart from one another.

As another example, in some embodiments, as shown in FIG. 12, the layer of reinforcing polymeric material 92 may include a plurality of segments $94_1$-$94_s$ that are spaced apart from one another and constitute respective parts of the inner surface 32 of the carcass 35. This may be useful to rigidify, protect and/or otherwise enhance certain regions of the inner surface 32 of the carcass 35.

For instance, in this embodiment, the segments $94_1$-$94_s$ of the layer of reinforcing polymeric material 92 may be disposed to engage the sliding surfaces $77_1$, $77_2$ of the rails $44_1$, $44_2$ and/or the idler wheels $26_1$, $26_2$, $28_1$-$28_6$ of the track-engaging assembly 24 of the track system 14. This may help to facilitate relative motion (e.g., reduce friction) between the bottom run 66 of the track 21 and the sliding surfaces $77_1$, $77_2$ and/or the idler wheels $26_1$, $26_2$, $28_1$-$28_6$.

Where a coefficient of friction between the reinforcing polymeric material 51 and the sliding surfaces $77_1$, $77_2$ and/or the idler wheels $26_1$, $26_2$, $28_1$-$28_6$ is less than a coefficient of friction between the elastomeric material 38 of the carcass 35 and the sliding surfaces $77_1$, $77_2$ and/or the idler wheels $26_1$, $26_2$, $28_1$-$28_6$, this may help to reduce frictional effects between these components.

More particularly, in this embodiment, the segments $94_1$-$94_s$ of the layer of reinforcing polymeric material 92 are disposed to slide against the sliding surfaces $77_1$, $77_2$ of the rails $44_1$, $44_2$ of the track-engaging assembly 24. This allows the track 21 to be free of slide members (e.g., clips), such as the slide members $39_1$-$39_S$ discussed above in respect of FIGS. 5 and 6, which could otherwise be used to slide against the sliding surfaces $77_1$, $77_2$ to reduce friction. This freeness from slide members may help to reduce the weight of the track 21.

Figure 13:
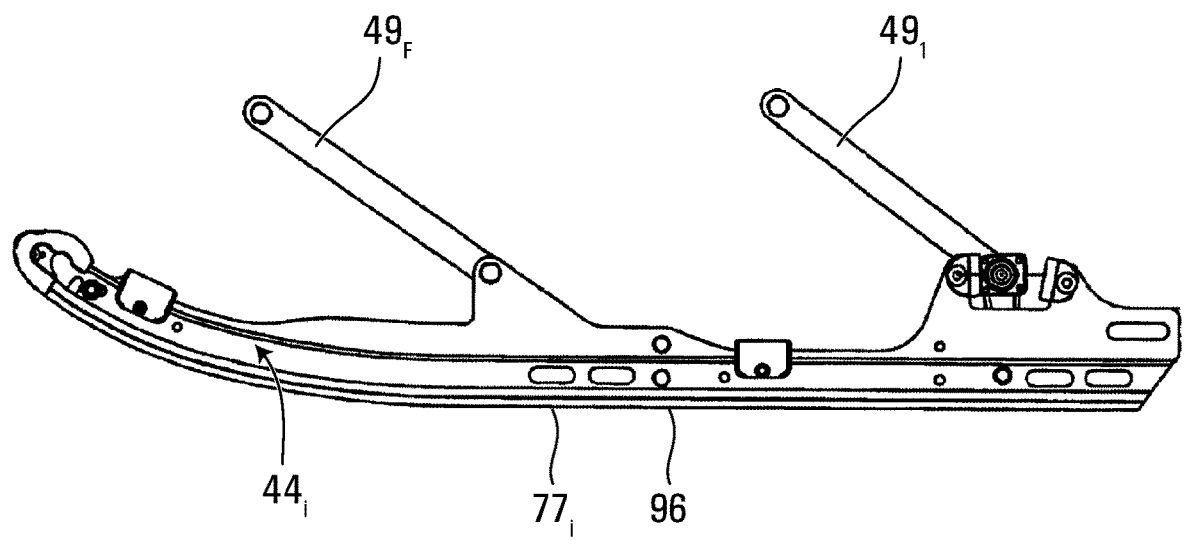
FIG. 13 shows a side elevation view of a rail of the track-engaging assembly of the track system.

In some cases, as shown in FIG. 13, the sliding surfaces $77_1$, $77_2$ of the rails $44_1$, $44_2$ of the track-engaging assembly 24 may be made of a material 96 that slides well against the segments $94_1$-$94_s$ of the inner side 25 of the track 21. For example, in some embodiments, the material 96 of the sliding surfaces $77_1$, $77_2$ of the rails $44_1$, $44_2$ of the track-engaging assembly 24 may be metallic material, such as aluminum.

Figure 14:
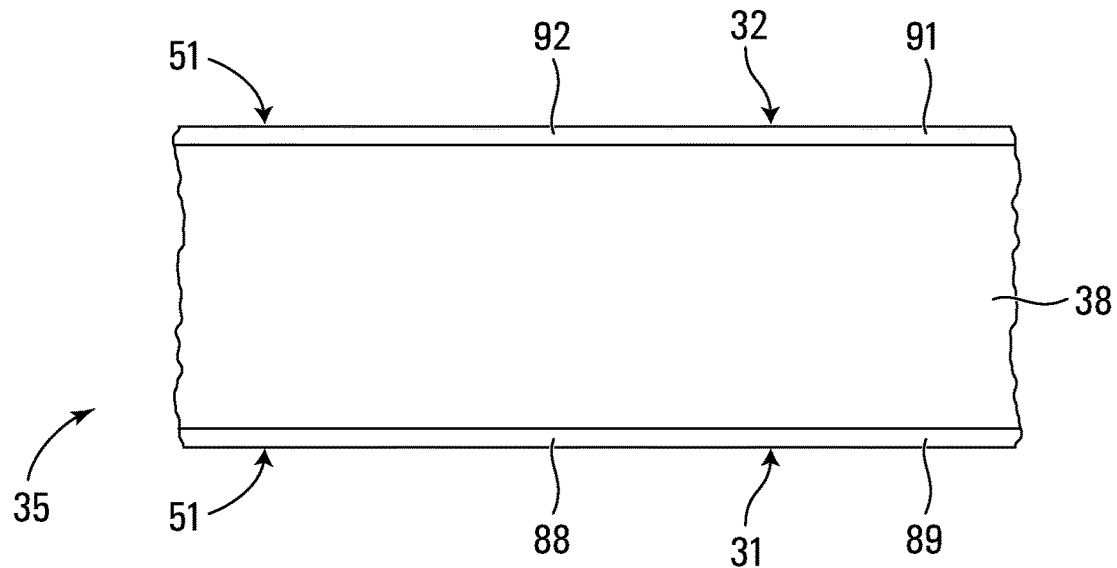
FIG. 14 shows another embodiment in which the reinforcing material of the track comprises a layer of reinforcing polymeric material constituting at least part of the ground-engaging outer surface of the carcass and a layer of reinforcing polymeric material constituting at least part of the inner surface of the carcass.

As another example, in some embodiments, as shown in FIG. 14, the reinforcing polymeric material 51 may comprise the layer of reinforcing polymeric material 92 constituting at least part of the inner surface 32 of the carcass 35 and the layer of reinforcing polymeric material 88 constituting at least part of the ground-engaging outer surface 31 of the carcass 35.

In some embodiments, the layer of reinforcing polymeric material 92 constituting at least part of the inner surface 32 of the carcass 35 and the layer of reinforcing polymeric material 88 constituting at least part of the ground-engaging outer surface 31 of the carcass 35 may be substantially identical in thickness and material composition. That is, the thickness $T_1$ of the layer of reinforcing polymeric material 88 is substantially identical to the thickness $T_2$ of the layer of reinforcing polymeric material 92 and a material composition of the layer of reinforcing polymeric material 88 is substantially identical to a material composition of the layer of reinforcing polymeric material 92.

In other embodiments, the layer of reinforcing polymeric material 92 constituting at least part of the inner surface 32 of the carcass 35 and the layer of reinforcing polymeric material 88 constituting at least part of the ground-engaging outer surface 31 of the carcass 35 may differ in thickness and/or material composition. That is, the thickness $T_1$ of the layer of reinforcing polymeric material 88 is different from the thickness $T_2$ of the layer of reinforcing polymeric material 92 and/or the material composition of the layer of reinforcing polymeric material 88 is different from the material composition of the layer of reinforcing polymeric material 92.

For instance, in some embodiments, a stiffness of the layer of reinforcing polymeric material 92 constituting at least part of the inner surface 32 of the carcass 35 may be different from a stiffness of the layer of reinforcing polymeric material 88 constituting at least part of the ground-engaging outer surface 31 of the carcass 35.

Notably, the layer of reinforcing polymeric material 88 constituting at least part of the ground-engaging outer surface 31 of the carcass 35 may be stiffer than the layer of reinforcing polymeric material 92 constituting at least part of the inner surface 32 of the carcass 35. This may be implemented in various ways. For example, the thickness $T_1$ of the layer of reinforcing polymeric material 88 may be greater than the thickness $T_2$ of the layer of reinforcing polymeric material 92. For instance, in some cases, a ratio $T_1/T_2$ of the thickness $T_1$ of the layer of reinforcing polymeric material 88 over the thickness $T_2$ of the layer of reinforcing polymeric material 92 may be at least 1.1, in some cases at least 1.3, in some cases at least 1.5, in some cases at least. 1.7, in some cases at least 2 and in some cases even more.

Alternatively or additionally, a material 89 of the layer of reinforcing polymeric material 88 constituting at least part of the ground-engaging outer surface 31 of the carcass 35 may be stiffer than a material 91 of the layer of reinforcing polymeric material 92 constituting at least part of the inner surface 32 of the carcass 35. For instance, in some cases, a ratio of the modulus of elasticity of the material 89 of the layer of reinforcing polymeric material 88 over the modulus of elasticity of the material 91 of the layer of reinforcing polymeric material 92 may be at least 2, in some cases at least 5, in some cases at least 10, in some cases at least 20, in some cases at least 35 and in some cases even more.

In other embodiments, the layer of reinforcing polymeric material 92 constituting at least part of the inner surface 32 of the carcass 35 may be stiffer than the layer of reinforcing polymeric material 88 constituting at least part of the ground-engaging outer surface 31 of the carcass 35.

For example, the thickness $T_2$ of the layer of reinforcing polymeric material 92 may be greater than the thickness $T_1$ of the layer of reinforcing polymeric material 88. For instance, in some cases, a ratio $T_2/T_1$ of the thickness $T_2$ of the layer of reinforcing polymeric material 92 over the thickness $T_1$ of the layer of reinforcing polymeric material 88 may be at least 1.1, in some cases at least 1.3, in some cases at least 1.5, in some cases at least. 1.7, in some cases at least 2 and in some cases even more.

Alternatively or additionally, the material 91 of the layer of reinforcing polymeric material 92 constituting at least part of the inner surface 32 of the carcass 35 may be stiffer than the material 89 of the layer of reinforcing polymeric material 88 constituting at least part of the ground-engaging outer surface 31 of the carcass 35. For instance, in some cases, a ratio of the modulus of elasticity of the material 91 of the layer of reinforcing polymeric material 92 over the modulus of elasticity of the material 89 of the layer of reinforcing polymeric material 88 may be at least 2, in some cases at least 5, in some cases at least 10, in some cases at least 20, in some cases at least 35 and in some cases even more.

2. Traction Projection's Periphery

Figure 15:
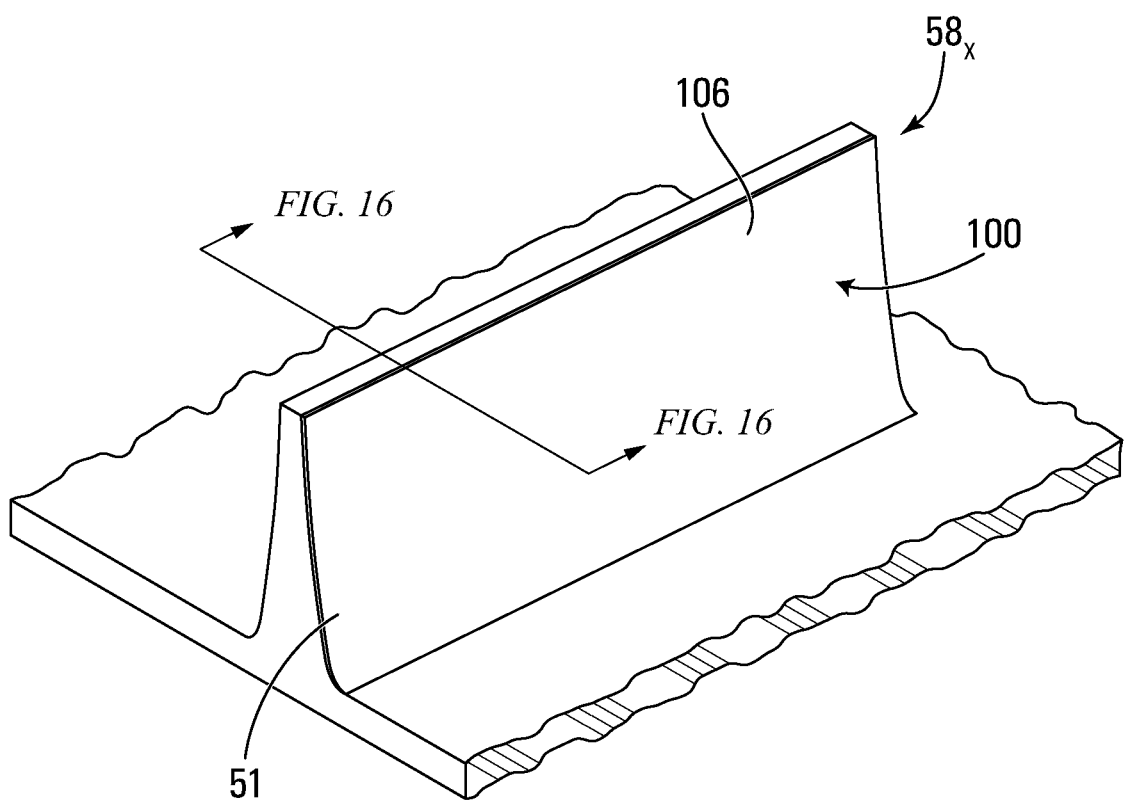
FIG. 15 shows a perspective view of a traction projection of the track where a layer of reinforcing polymeric material of the reinforcing material of the track constitutes at least part of a rear surface of the traction projection.
Figure 16:
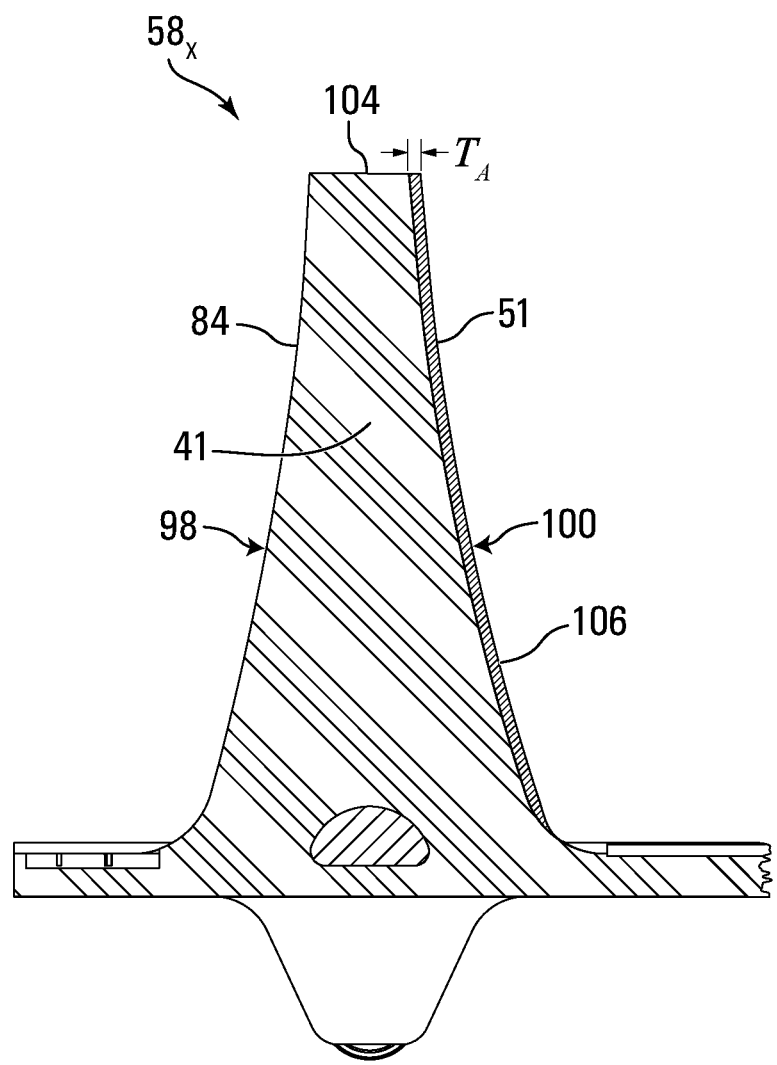
FIG. 16 shows a cross-sectional view of the traction projection as indicated in FIG. 15.

In some embodiments, as shown in FIGS. 15 and 16, the reinforcing polymeric material 51 of the track 21 may constitute at least part of the periphery 84 of a traction projection $58_x$ of the track 21, such as at least part of a front surface 98, a rear surface 100, lateral surfaces $102_1$, $102_2$, and/or a tip 104 of the traction projection $58_x$. This may improve rigidity characteristics of the traction projection $58_x$, improve a resistance to wear of the traction projection $58_x$, and/or reduce a weight of the traction projection $58_x$ and thus the weight of the track 21.

For example, in this embodiment, the reinforcing polymeric material 51 may comprise a layer of reinforcing polymeric material 106 constituting at least part of a given one of the front surface 98 and the rear surface 100 of the traction projection $58_x$, while the other one of the front surface 98 and the rear surface 100 of the traction projection $58_x$ is free of reinforcing polymeric material. More particularly, in this embodiment, the layer of reinforcing polymeric material 106 constitutes at least part of the rear surface 100 of the traction projection $58_x$, while the front surface 98 of the traction projection $58_x$ is free of reinforcing polymeric material.

Where the layer of reinforcing polymeric material 106 is stiffer than the elastomeric material 41 of the traction projection $58_x$, this may help to increase a rigidity of the traction projection $58_x$. Also, in this example, this may make it easier for the traction projection $58_x$ to flex in a given way (e.g., forwardly) in the longitudinal direction of the track 21 than to flex in an opposite way (e.g., rearwardly) in the longitudinal direction of the track 21, thus creating an "asymmetrical" bending stiffness of the traction projection $58_x$.

Where the layer of reinforcing polymeric material 106 is more resistant to wear (e.g., abrasion and/or tearing) than the elastomeric material 41 of the traction projection 58$_x$, this may help to protect the traction projection 58$_x$ and reduce wear of the traction projection 58$_x$ as the track 21 travels on the ground.

This may also help to reduce a size of the traction projection 58$_x$, such as by using less of the elastomeric material 41 of the traction projection 58$_x$. In turn, this may reduce the weight of the traction projection 58$_x$ and, thus, the weight of the track 21.

In this embodiment, the layer of reinforcing polymeric material 106 may occupy at least a majority (i.e., a majority or an entirety) of the length L of the traction projection 58$_x$ in the widthwise direction of the track 21. In this embodiment, the layer of reinforcing polymeric material 106 occupies the entirety of the length L.

The layer of reinforcing polymeric material 106 is thin. For instance, in this embodiment, a thickness T$_A$ of the layer of reinforcing polymeric material 106 is less than a dimension W$_L$ of the traction projection 58$_x$ in the longitudinal direction of the track 21. For example, in some cases, a ratio T$_A$/ W$_L$ of the thickness T$_A$ of the layer of reinforcing polymeric material 106 over the dimension W$_L$ of the traction projection 58$_x$ in the longitudinal direction of the track 21 may be no more than 0.2, in some cases no more than 0.1, in some cases no more than 0.05, in some cases no more than 0.01 and in some cases even less (e.g., 0.004).

Figure 17:
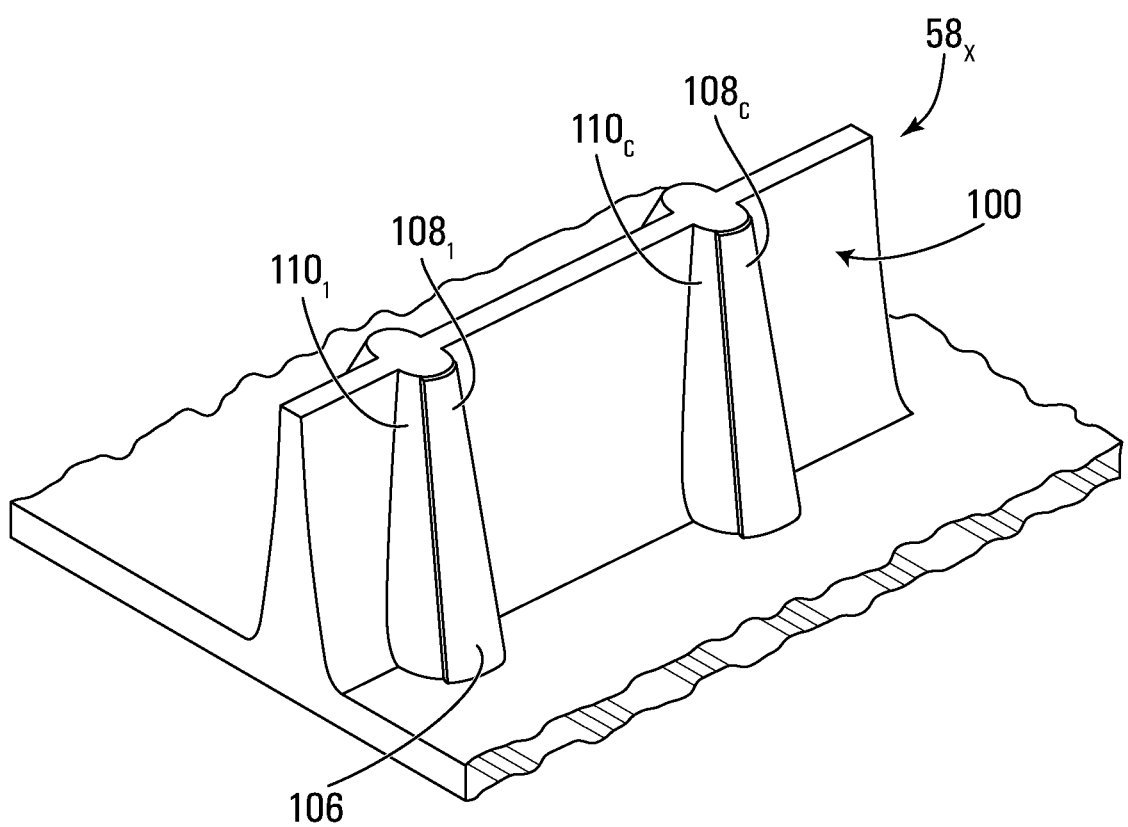
FIG. 17 shows a perspective view of the traction projection of the track in accordance with another embodiment in which a layer of reinforcing polymeric material that constitutes at least part of the rear surface of the traction projection includes a plurality of segments spaced apart from one another.

As another example, in some embodiments, as shown in FIG. 17, the layer of reinforcing polymeric material 106 includes a plurality of segments 108$_1$-108$_c$ that are spaced apart from one another and constitute respective parts of the rear surface 100 of the traction projection 58$_x$. This may be useful to rigidify, protect and/or otherwise enhance certain regions of the traction projection 58$_x$.

Figure 39:
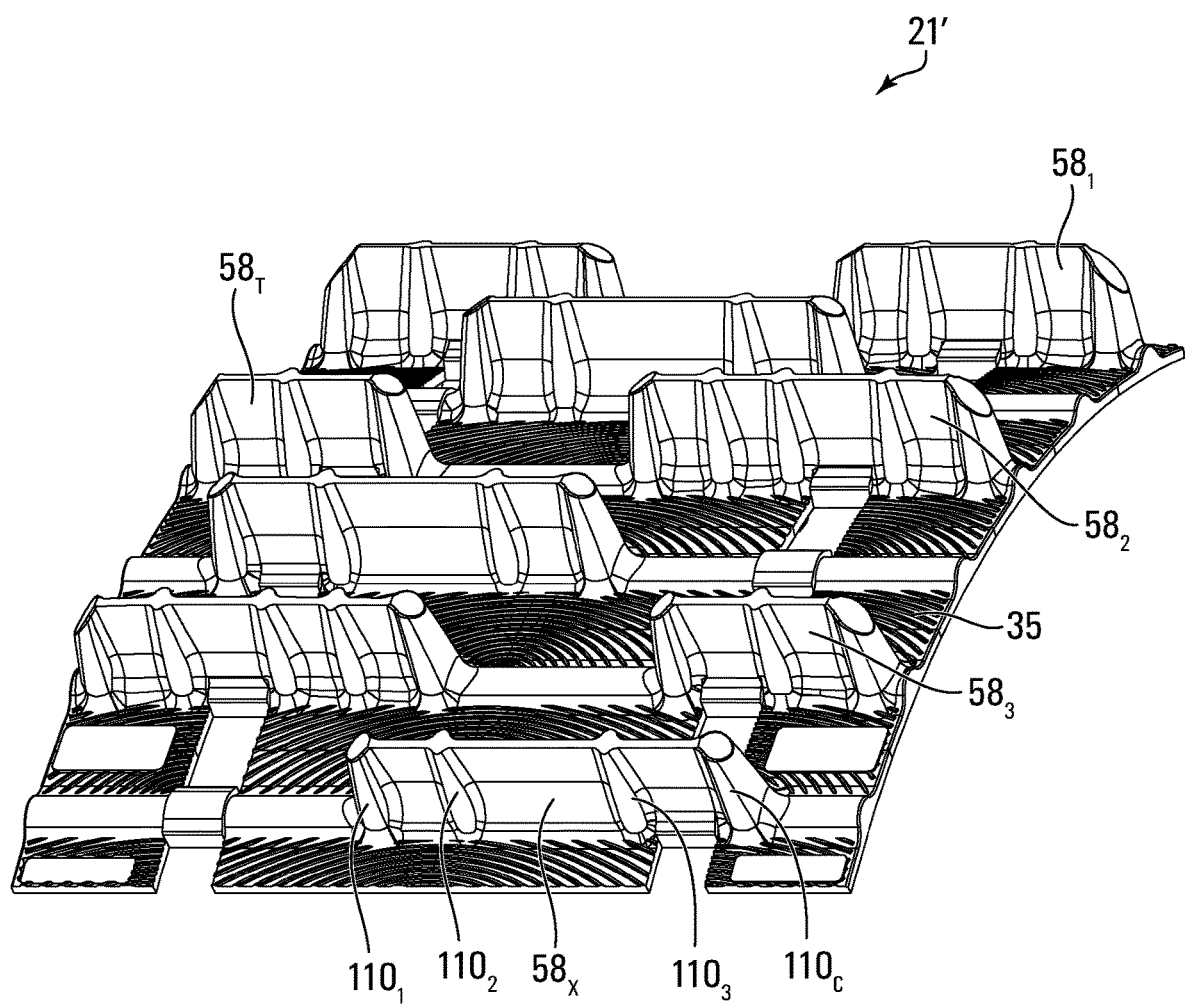
FIG. 39 shows an example of another embodiment in which the traction projections of the track comprise columns.

More particularly, in this embodiment, with additional reference to FIG. 39, the segments 108$_1$-108$_c$ are part of columns 110$_1$-110$_c$ of the traction projection 58$_x$ of a track 21' that is otherwise similar to the track 21. The columns 110$_1$-110$_c$ constitute parts of the traction projection 58$_x$ that are enlarged relative to a majority of the traction projection 58$_x$ in the longitudinal direction of the track 21. In this embodiment, the columns 110$_1$-110$_c$ extend in a height direction of the traction projection 58$_x$ for a majority (i.e., a majority or an entirety) of the height H$_o$ of the traction projection 58$_x$. More specifically, in this embodiment the columns 110$_1$-110$_c$ are ribs that rigidify the traction projection 58$_x$. The presence of the segments 108$_1$-108$_c$ on the columns 110$_1$-110$_c$ may further enhance the rigidifying effect that the columns 110$_1$-110$_c$ have on the traction projection 58$_x$.

Figure 18:
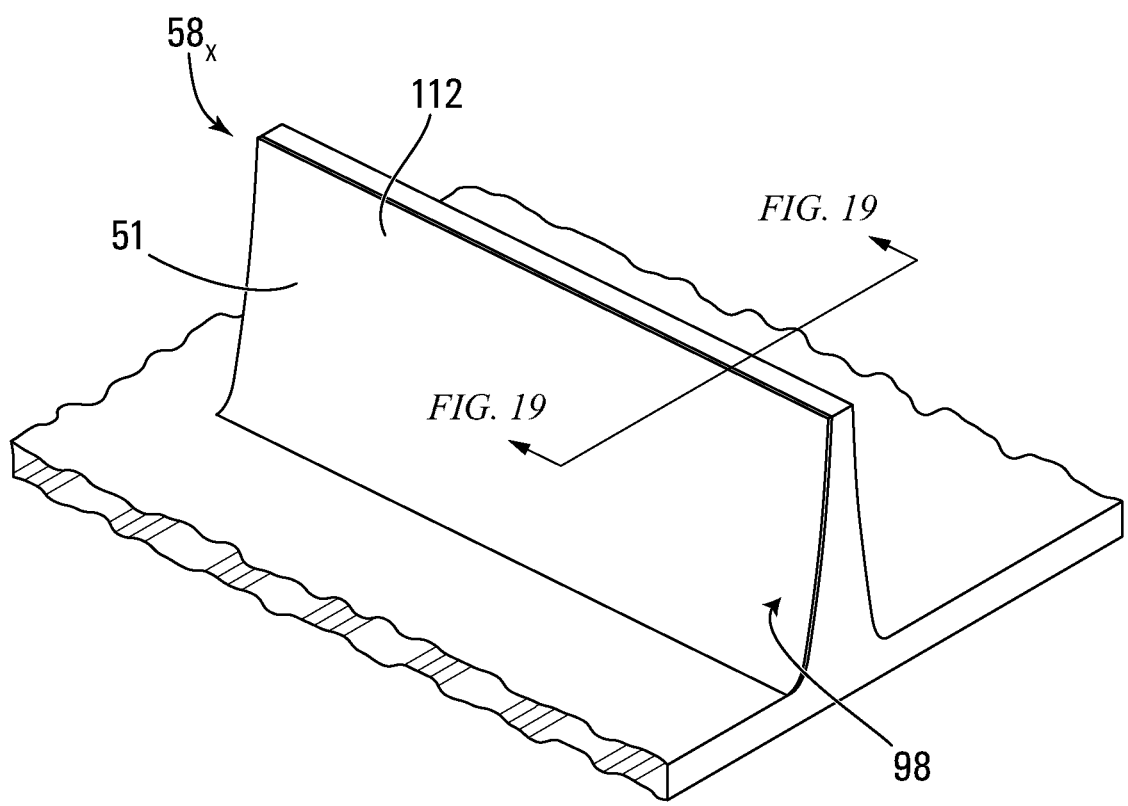
FIG. 18 shows a perspective view of the traction projection of the track in accordance with another embodiment in which a layer of reinforcing polymeric material of the reinforcing material of the track constitutes at least part of a front surface of the traction projection.
Figure 19:
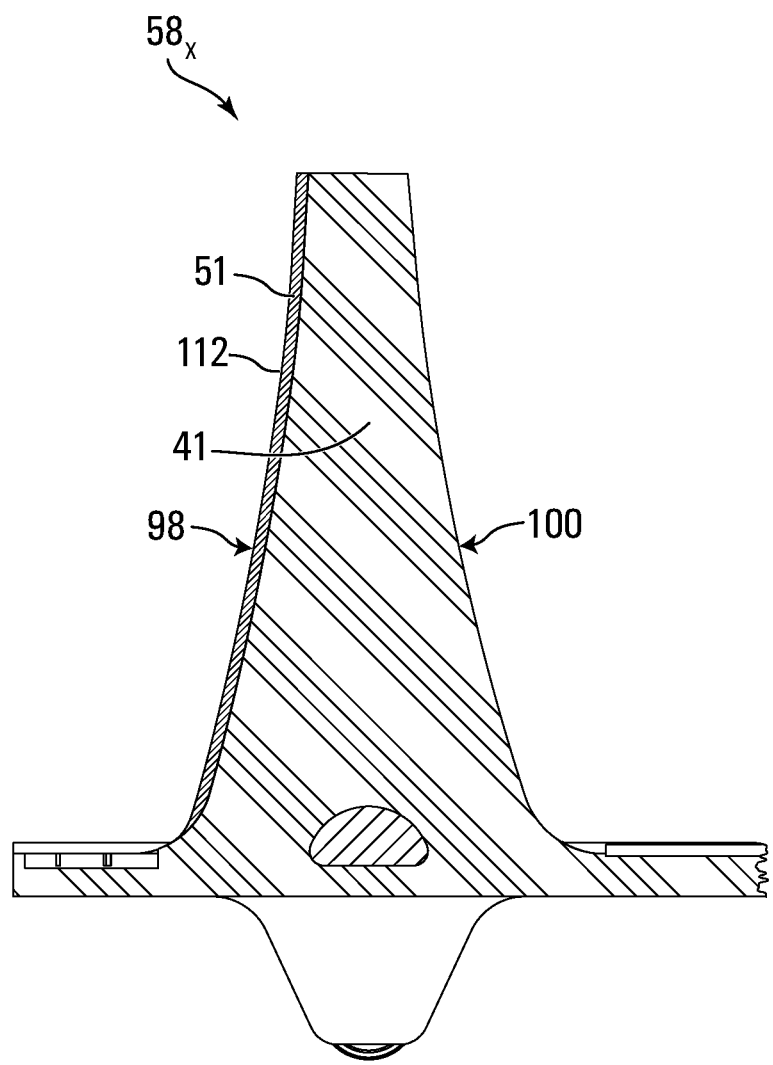
FIG. 19 shows a cross-sectional view of the traction projection as indicated in FIG. 18.
Figure 20:
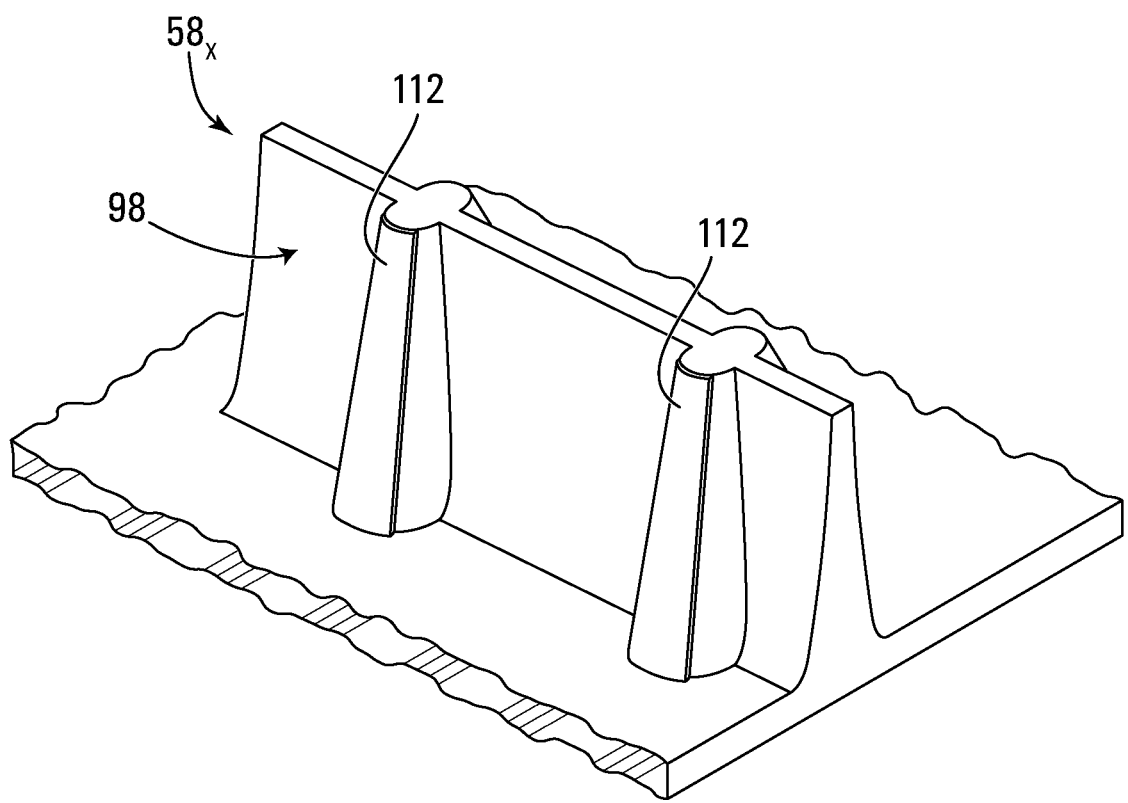
FIG. 20 shows a perspective view of the traction projection of the track in accordance with another embodiment in which a layer of reinforcing polymeric material that constitutes at least part of the front surface of the traction projection includes a plurality of segment spaced apart from one another.

As another example, in some embodiments, as shown in FIGS. 18 to 20, the reinforcing polymeric material 51 may comprise a layer of reinforcing polymeric material 112 constituting at least part of the front surface 98 of the traction projection 58$_x$, while the rear surface 100 of the traction projection 58$_x$ is free of reinforcing polymeric material. This may have similar effects as described above in respect of the layer of reinforcing polymeric material 106 constituting at least part of the rear surface 100 of the traction projection 58$_x$.

Figure 21:
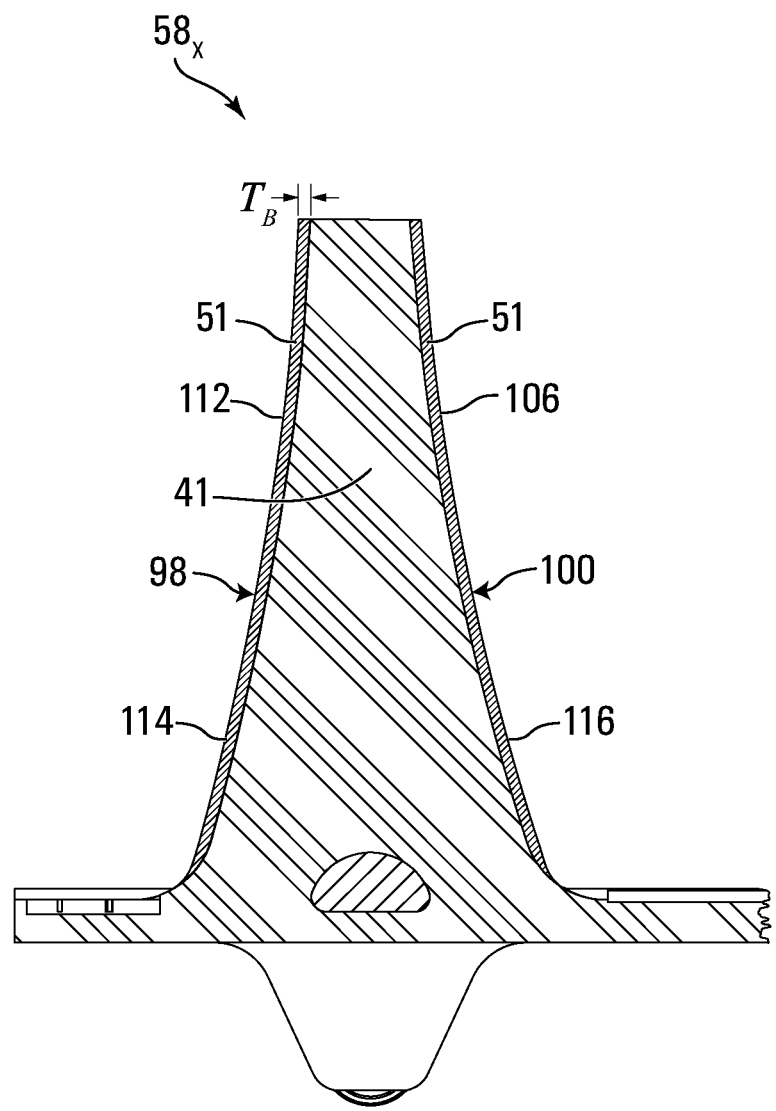
FIG. 21 shows a longitudinal cross-sectional view of the traction projection of the track in accordance with another embodiment in which the reinforcing material of the track comprises a layer of reinforcing polymeric material constituting at least part of the front surface of the traction projection and a layer of reinforcing polymeric material constituting at least part of the rear surface of the traction projection.

As another example, in some embodiments, as shown in FIG. 21, the reinforcing polymeric material 51 may comprise the layer of reinforcing polymeric material 112 constituting at least part of the front surface 98 of the traction projection 58$_x$ and the layer of reinforcing polymeric material 106 constituting at least part of the rear surface 100 of the traction projection 58$_x$. This may have similar effects as described above.

In some embodiments, the layer of reinforcing polymeric material 106 constituting at least part of the rear surface 100 of the traction projection 58$_x$ and the layer of reinforcing polymeric material 112 constituting at least part of the front surface 98 of the traction projection 58$_x$ may be substantially identical in thickness and material composition. That is, the thickness T$_A$ of the layer of reinforcing polymeric material 106 is substantially identical to a thickness T$_B$ of the layer of reinforcing polymeric material 112 and a material composition of the layer of reinforcing polymeric material 106 is substantially identical to a material composition of the layer of reinforcing polymeric material 112.

In other embodiments, the layer of reinforcing polymeric material 106 constituting at least part of the rear surface 100 of the traction projection 58$_x$ and the layer of reinforcing polymeric material 112 constituting at least part of the front surface 98 of the traction projection 58$_x$ may differ in thickness and/or material composition. That is, the thickness T$_A$ of the layer of reinforcing polymeric material 106 is different from the thickness T$_B$ of the layer of reinforcing polymeric material 112 and/or the material composition of the layer of reinforcing polymeric material 106 is different from the material composition of the layer of reinforcing polymeric material 112.

For instance, in some embodiments, a stiffness of the layer of reinforcing polymeric material 106 constituting at least part of the rear surface 100 of the traction projection 58$_x$ may be different from a stiffness of the layer of reinforcing polymeric material 112 constituting at least part of the front surface 98 of the traction projection 58$_x$.

Notably, the layer of reinforcing polymeric material 112 constituting at least part of the front surface 98 of the traction projection 58$_x$ may be stiffer than the layer of reinforcing polymeric material 106 constituting at least part of the rear surface 100 of the traction projection 58$_x$. This may be implemented in various ways. For example, the thickness T$_B$ of the layer of reinforcing polymeric material 112 may be greater than the thickness T$_A$ of the layer of reinforcing polymeric material 106. For instance, in some cases, a ratio T$_B$/T$_A$ of the thickness T$_B$ of the layer of reinforcing polymeric material 112 over the thickness T$_A$ of the layer of reinforcing polymeric material 106 may be at least 1.2, in some cases at least 1.5, in some cases at least 2, in some cases at least 3, in some cases at least 4 and in some cases even more.

Alternatively or additionally, a material 114 of the layer of reinforcing polymeric material 112 constituting at least part of the front surface 98 of the traction projection 58$_x$ may be stiffer than a material 116 of the layer of reinforcing polymeric material 106 constituting at least part of the rear surface 100 of the traction projection 58$_x$. For instance, in some cases, a ratio of the modulus of elasticity of the material 114 of the layer of reinforcing polymeric material 112 over the modulus of elasticity of the material 116 of the layer of reinforcing polymeric material 106 may be at least 2, in some cases at least 5, in some cases at least 10, in some cases at least 20, in some cases at least 35 and in some cases even more.

In other embodiments, the layer of reinforcing polymeric material 106 constituting at least part of the rear surface 100 of the traction projection 58$_x$ may be stiffer than the layer of reinforcing polymeric material 112 constituting at least part of the front surface 98 of the traction projection 58$_x$.

For example, the thickness T$_A$ of the layer of reinforcing polymeric material 106 may be greater than the thickness T$_B$ of the layer of reinforcing polymeric material 112. For instance, in some cases, a ratio T$_A$/T$_B$ of the thickness T$_A$ of the layer of reinforcing polymeric material 106 over the thickness $T_B$ of the layer of reinforcing polymeric material 112 may be at least 1.2, in some cases at least 1.5, in some cases at least 2, in some cases at least 3, in some cases at least 4 and in some cases even more.

Alternatively or additionally, the material 116 of the layer of reinforcing polymeric material 106 constituting at least part of the rear surface 100 of the traction projection $58_x$ may be stiffer than the material 114 of the layer of reinforcing polymeric material 112 constituting at least part of the front surface 98 of the traction projection $58_x$. For instance, in some cases, a ratio of the modulus of elasticity of the material 116 of the layer of reinforcing polymeric material 106 over the modulus of elasticity of the material 114 of the layer of reinforcing polymeric material 112 may be at least 2, in some cases at least 5, in some cases at least 10, in some cases at least 20, in some cases at least 35 and in some cases even more.

Figure 22:
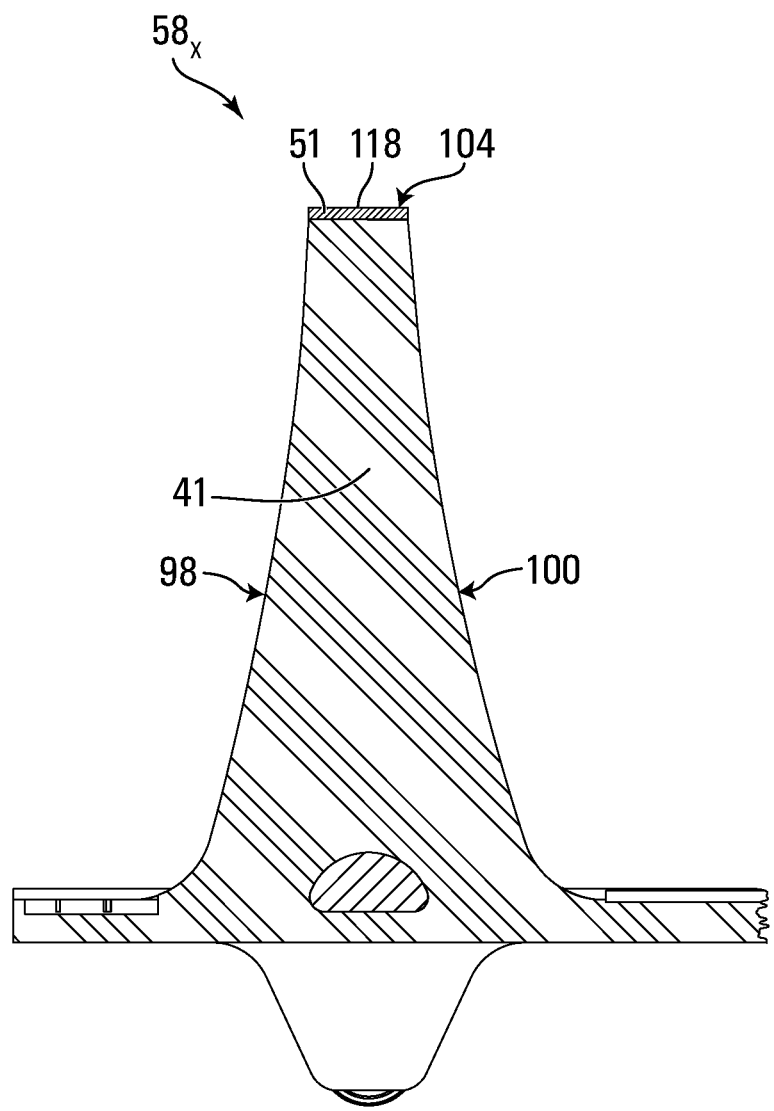
FIG. 22 shows a longitudinal cross-sectional view of the traction projection of the track in accordance with another embodiment in which the reinforcing material of the track comprises a layer of reinforcing polymeric material constituting at least part of a tip of the traction projection.

As another example, in some embodiments, as shown in FIG. 22, the reinforcing polymeric material 51 may comprise a layer of reinforcing polymeric material 118 constituting at least part of the tip 104 of the traction projection $58_x$. This may help to protect the traction projection $58_x$ against wear. This may also help to reduce or avoid markings on the ground by the elastomeric material 41 of the traction projection $58_x$ (e.g., emulating a type of "non-marking" rubber).

Figure 23:
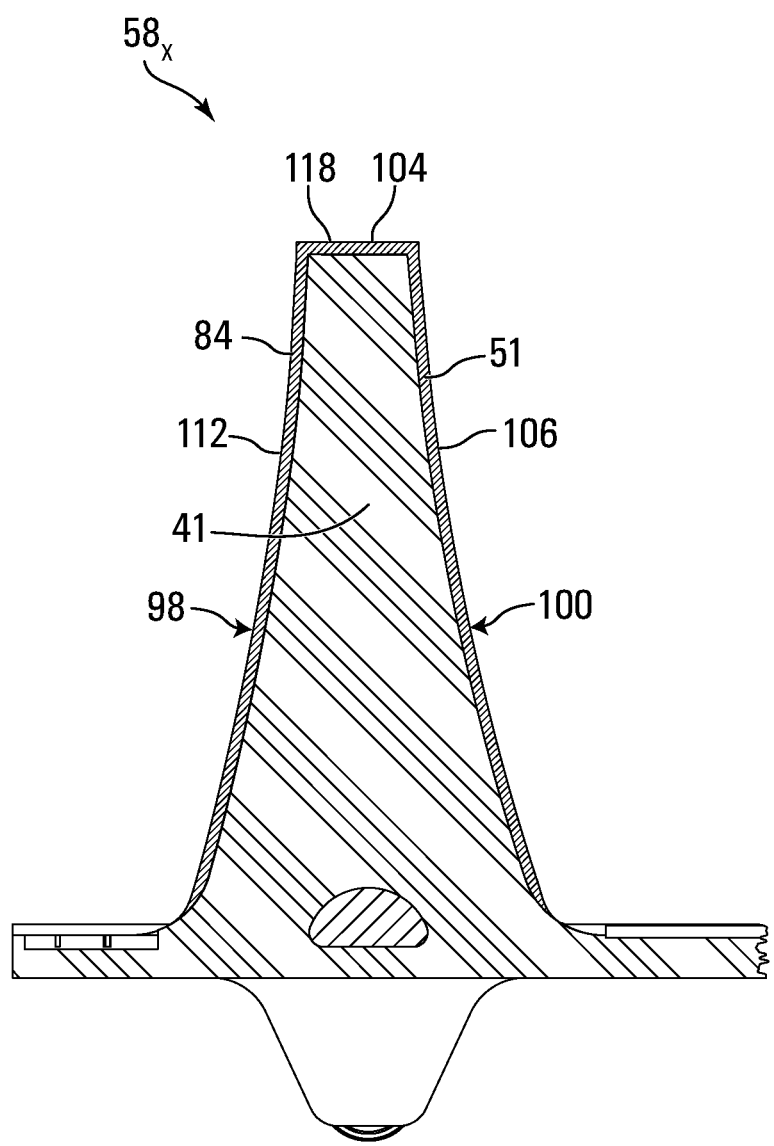
FIG. 23 shows a longitudinal cross-sectional view of the traction projection of the track in accordance with another embodiment in which the reinforcing material of the track comprises a layer of reinforcing polymeric material constituting at least part of the front surface of the traction projection, a layer of reinforcing polymeric material constitutes at least part of the rear surface of the traction projection and a layer of reinforcing polymeric material constitutes at least part of the tip of the traction projection.

As another example, in some embodiments, as shown in FIG. 23, the reinforcing polymeric material 51 may comprise the layer of reinforcing polymeric material 112 constituting at least part of the front surface 98 of the traction projection $58_x$, the layer of reinforcing polymeric material 106 constituting at least part the rear surface 100 of the traction projection $58_x$, and the layer of reinforcing polymeric material 118 constituting at least part of the tip 104 of the traction projection $58_x$.

Figure 24:
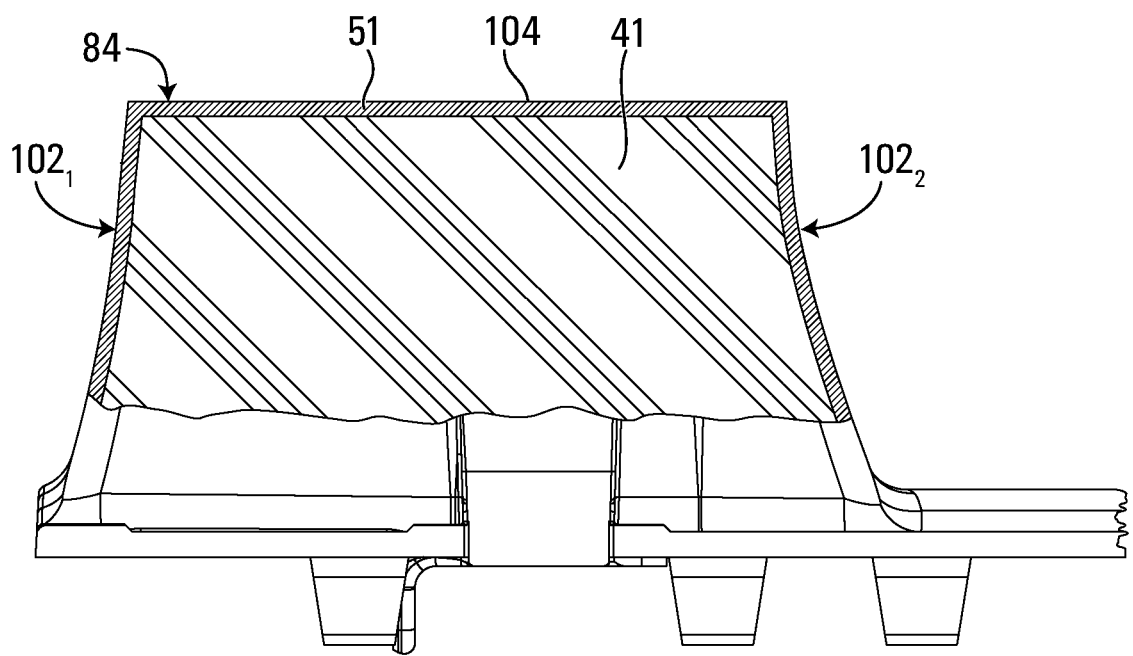
FIG. 24 shows a widthwise cross-sectional view of the traction projection of the track in accordance with another embodiment in which the reinforcing material of the track constitutes an entirety of the periphery of the traction projection.

For instance, in this embodiment, as shown in FIG. 24, the reinforcing polymeric material 51 may constitute at least a majority of the periphery 84 of the traction projection $58_x$. In this example, the reinforcing polymeric material 51 constitutes an entirety of the periphery 84 of the traction projection $58_x$, such that the elastomeric material 41 of the traction projection $58_x$ is completely covered by the reinforcing polymeric material 51.

3. Drive/guide's Lug Periphery

Figure 25:
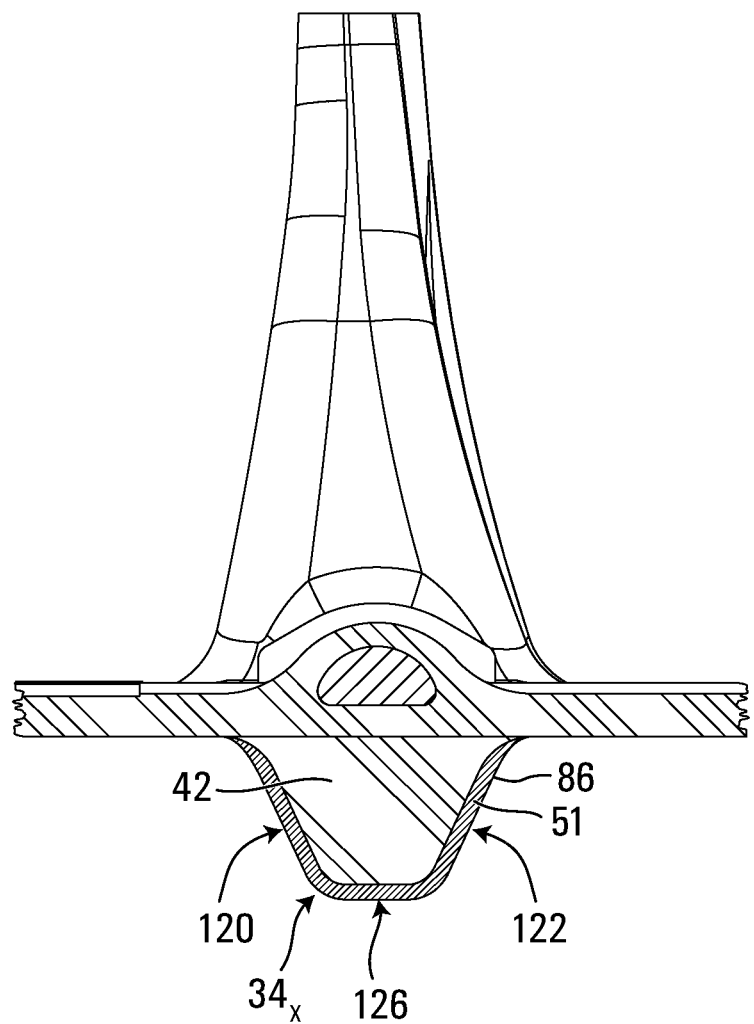
FIGS. 25 and 26 show a longitudinal and a widthwise cross-sectional view of a drive/guide lug of the track in accordance in an embodiment in which the reinforcing material of the track constitutes at least part of a periphery of the drive/guide lug.
Figure 26:
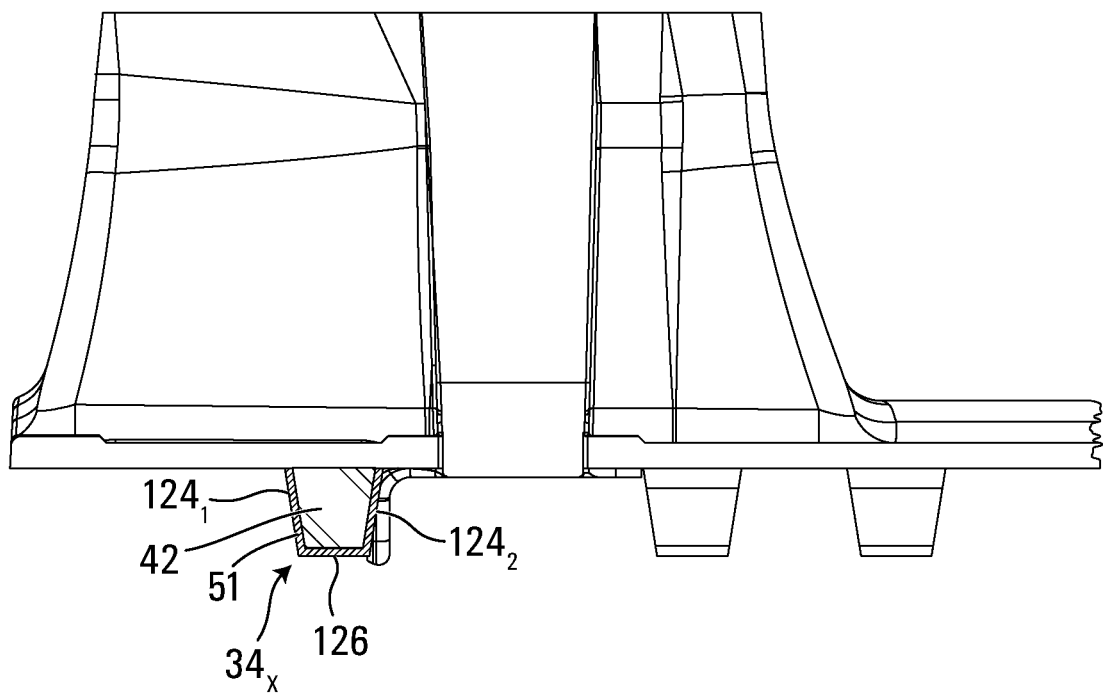

In some embodiments, as shown in FIGS. 25 and 26, the reinforcing polymeric material 51 of the track 21 may constitute at least part of the periphery 86 of a drive/guide lug $34_x$ of the track 21, such as at least part of a front surface 120, a rear surface 122, lateral surfaces $124_1$, $124_2$, and/or a tip 126 of the drive/guide lug $34_x$. This may improve rigidity characteristics of the drive/guide lug $34_x$, improve a resistance to wear of the drive/guide lug $34_x$, and/or reduce a weight of the drive/guide lug $34_x$ and thus the weight of the track 21. This may be effected as discussed above in respect of the reinforcing polymeric material 51 constituting at least part of the periphery 84 of a traction projection $58_x$ of the track 21.

The track 21, including the reinforcing polymeric material 51, may be manufactured in any suitable way.

For example, in some embodiments, as mentioned above, the carcass 35 may be molded into shape in the molding process during which the rubber 38 is cured, such as by consolidating layers of rubber providing the rubber 38 of the carcass 35 in the mold, while the reinforcing cables $37_1$-$37_M$ and the layer of reinforcing fabric 43, and the traction projections $58_1$-$58_T$ and the drive/guide lugs $34_1$-$34_D$ are provided on the ground-engaging outer side 27 and the inner side 25 by being molded with the carcass 35 in the mold. In some examples of implementation, the elastomeric material 41 of one or more of the traction projections $58_1$-$58_T$ and/or the elastomeric material 42 of one or more of the drive/guide lugs $34_1$-$34_D$ may be at least partly formed by the layers of rubber provided in the mold to also provide the rubber 38 of the carcass 35. In other examples of implementation, the elastomeric material 41 of one or more of the traction projections $58_1$-$58_T$ and/or the elastomeric material 42 of one or more of the drive/guide lugs $34_1$-$34_D$ may be at least partly provided by distinct pieces (e.g., blocks) of elastomeric material placed in the mold and spaced in the longitudinal direction of the track 21.

The reinforcing polymeric material 51 may be provided in any suitable way in various embodiments.

Figure 27:
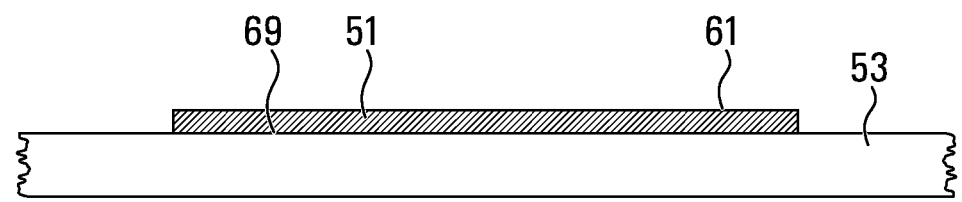
FIG. 27 shows an example of an embodiment in which the reinforcing material of the track is bonded to a portion of an elastomeric material of the track before molding of the track.

For instance, in some embodiments, as shown in FIG. 27, the reinforcing polymeric material 51 may be bonded to a portion 69 of the elastomeric material 53 of the track 21 before molding of the track 21. For instance, in some cases, the layer of reinforcing polymeric material 61 may be provided as a thin sheet bonded to a sheet of the elastomeric material 53. The layer of reinforcing polymeric material 61 may be provided as a thin sheet by calendering or extrusion of the layer of reinforcing polymeric material 61 or in any other suitable manner. The layer of reinforcing polymeric material 61 may be bonded to the sheet of elastomeric material 53 by applying pressure and heat between the layer of reinforcing polymeric material 61 and the sheet of elastomeric material 53. In addition or alternatively, in some cases, an adhesive may be used at an interface between the layer of reinforcing polymeric material 61 and the sheet of elastomeric material 53 in order to bond these to one another.

Figure 28:
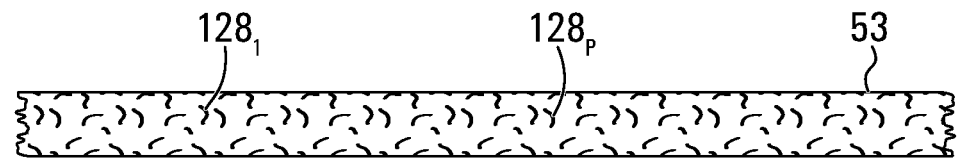
FIG. 28 an example of an embodiment in which the elastomeric material of the track is loaded with particles of reinforcing fabric material.

In some embodiments, as shown in FIG. 28, the elastomeric material 53 of the track 21 may be loaded with particles of reinforcing fabric material $128_1$-$128_P$ that correspond to the reinforcing polymeric material 51 to enhance bonding between the elastomeric material 53 and the reinforcing polymeric material 51. For instance, the rubber 53 may be loaded with the particles of reinforcing fabric material $128_1$-$128_P$ (e.g., in powder form) during manufacturing of the rubber 53. Upon the sheet of reinforcing polymeric material 61 being provided on the sheet of rubber 53 (e.g., during calendering or otherwise), the sheet of reinforcing polymeric material 61 chemically interacts with the particles of reinforcing fabric material $128_1$-$128_P$ in the sheet of rubber 53 to enhance their bonding.

In addition to enhancing the track 21, in some embodiments, the reinforcing polymeric material 51 may act as an unmolding agent (i.e., mold release agent) that facilitates release and removal of the track 21 from the mold upon completion of the molding process.

For instance, a friction coefficient between the reinforcing polymeric material 51 and a material of the mold in which the track 21 is molded may be lower than a friction coefficient between the elastomeric material 53 of the track 21 and the material of the mold. This may allow the molding process of the track 21 to be carried out without or with less of conventional mold release agent such as a silicone based release agent (e.g., a silicone resin) or polytetrafluoroethylene (PTFE).

The track 21, including the reinforcing material 51, may be implemented in various other ways in other embodiments.

For example, the reinforcing material 51 may be disposed elsewhere than at the periphery 80 of the track 21 (e.g., instead of or in addition to being disposed at the periphery 80 of the track 21). For example, the reinforcing material 51 may be disposed internally within the carcass 35, a traction projection 58$_x$ or a drive/guide lug 34$_x$.

As another example, the reinforcing material 51 may include two or more different constituents. For example, the reinforcing material 51 may include a plurality of layers of reinforcing polymeric material 130$_1$-130$_L$, where reinforcing polymeric materials of these layers are different from one another.

Figure 29:
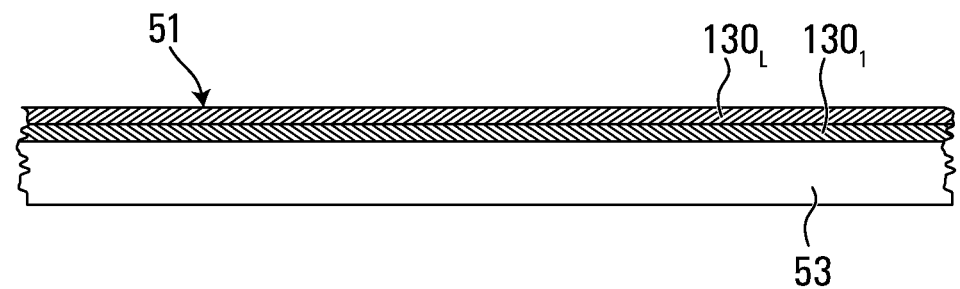
FIG. 29 shows an example of an embodiment in which the reinforcing material of the track includes a plurality of layers of reinforcing polymeric material that are adjacent to one another.
Figure 30:
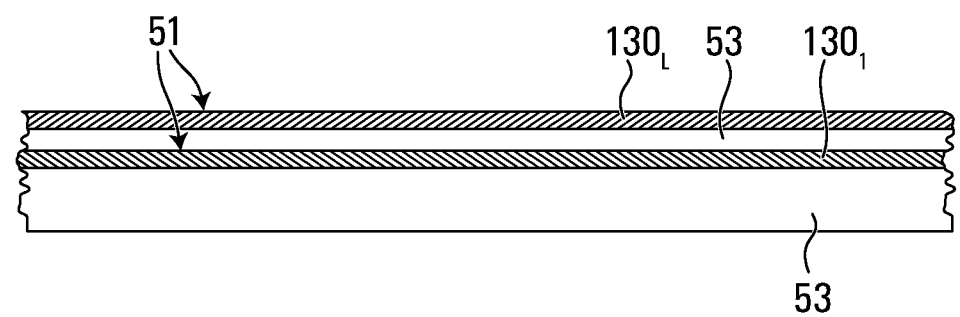
FIG. 30 shows an example of an embodiment in which the reinforcing material of the track includes a plurality of layers of reinforcing polymeric material that are spaced apart from one another.

For instance, in one example of implementation, as shown in FIG. 29, the layers of reinforcing polymeric material 130$_1$-130$_L$ may be adjacent to one another (e.g., stacked). Alternatively, in another example of implementation, as shown in FIG. 30, the layers of reinforcing polymeric material 130$_1$-130$_L$ may be spaced apart from one another.

Figure 31:
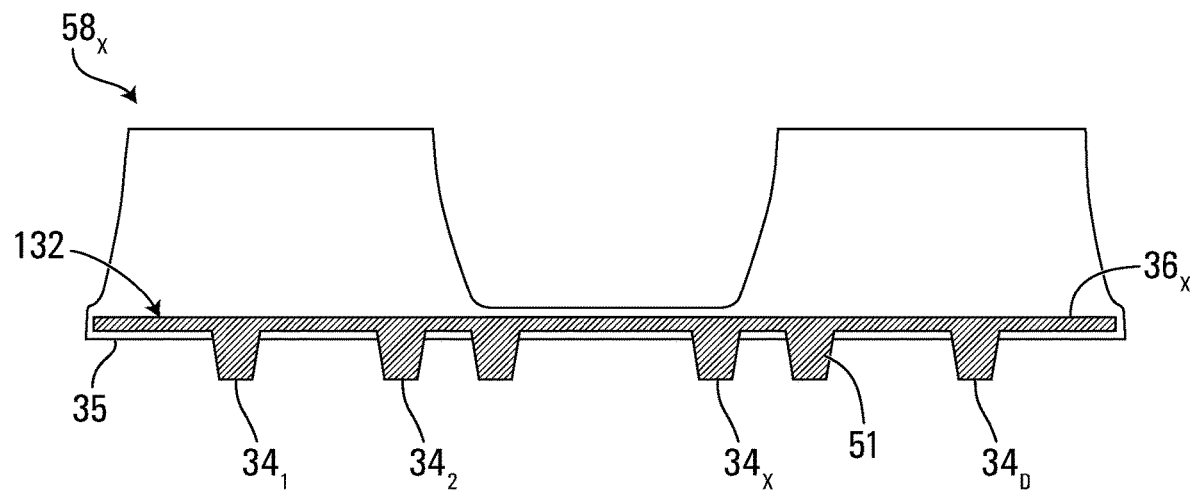
FIG. 31 shows an example of an embodiment in which the reinforcing material of the track constitutes at least part of a reinforcement embedded in the carcass of the track and selected drive/guide lugs of the track.
Figure 32:
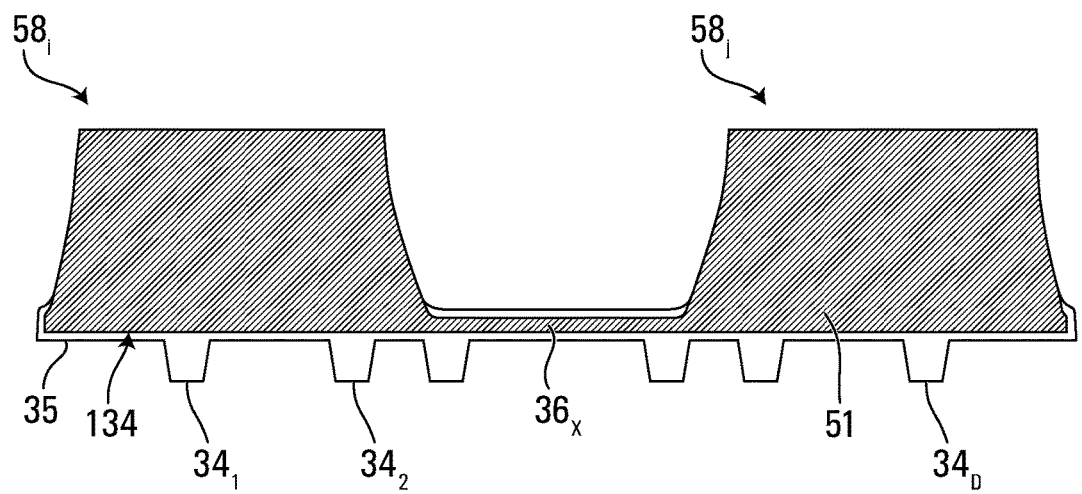
FIG. 32 shows an example of an embodiment in which the reinforcing material of the track constitutes at least part of a reinforcement embedded in the carcass of the track and selected traction projections of the track.
Figure 33:
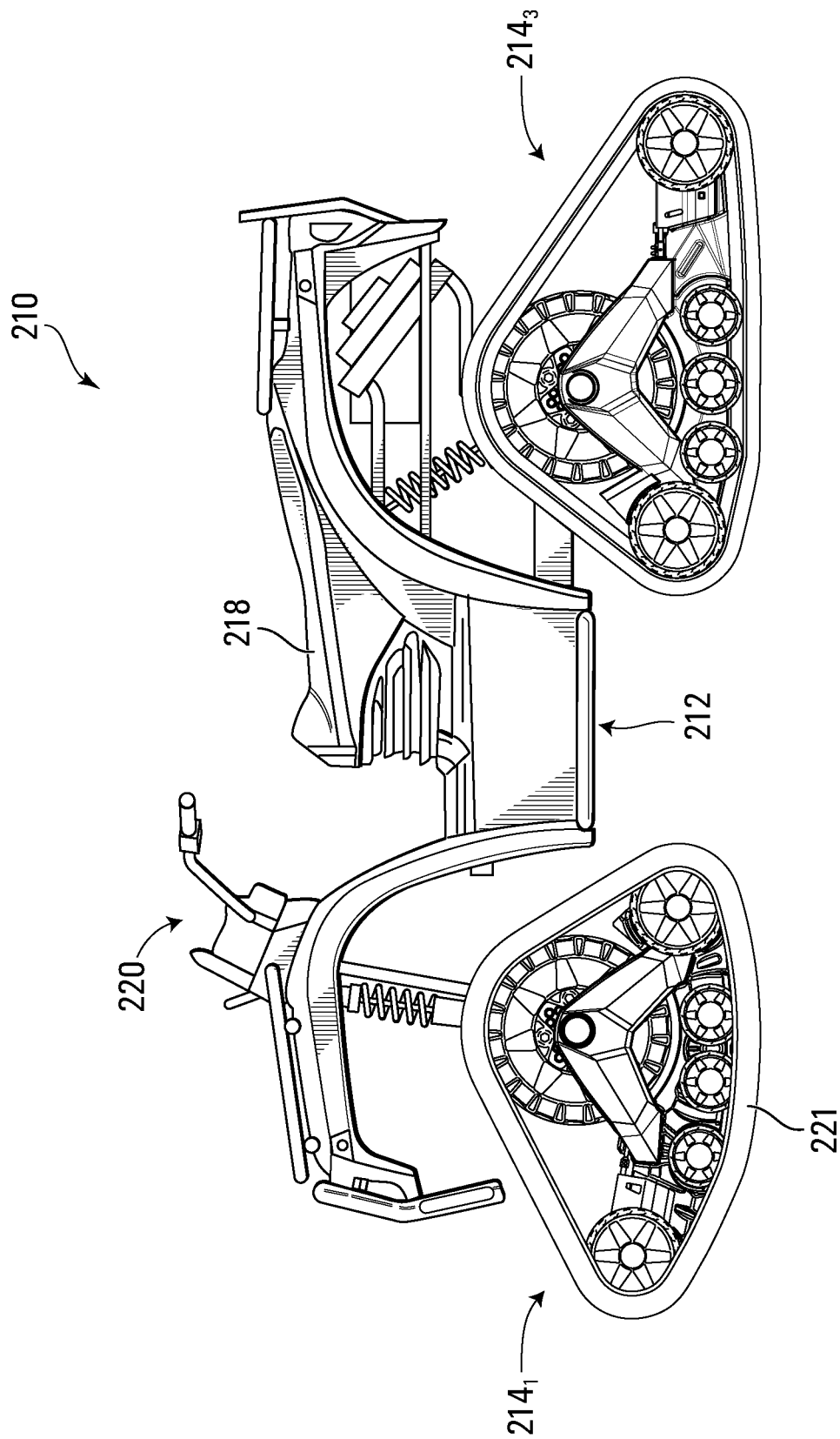
FIGS. 33, 34, 35, and 36 show an example of an all-terrain vehicle (ATV) comprising track systems in accordance with another embodiment of the invention, instead of being equipped with ground-engaging wheels.
Figure 34:
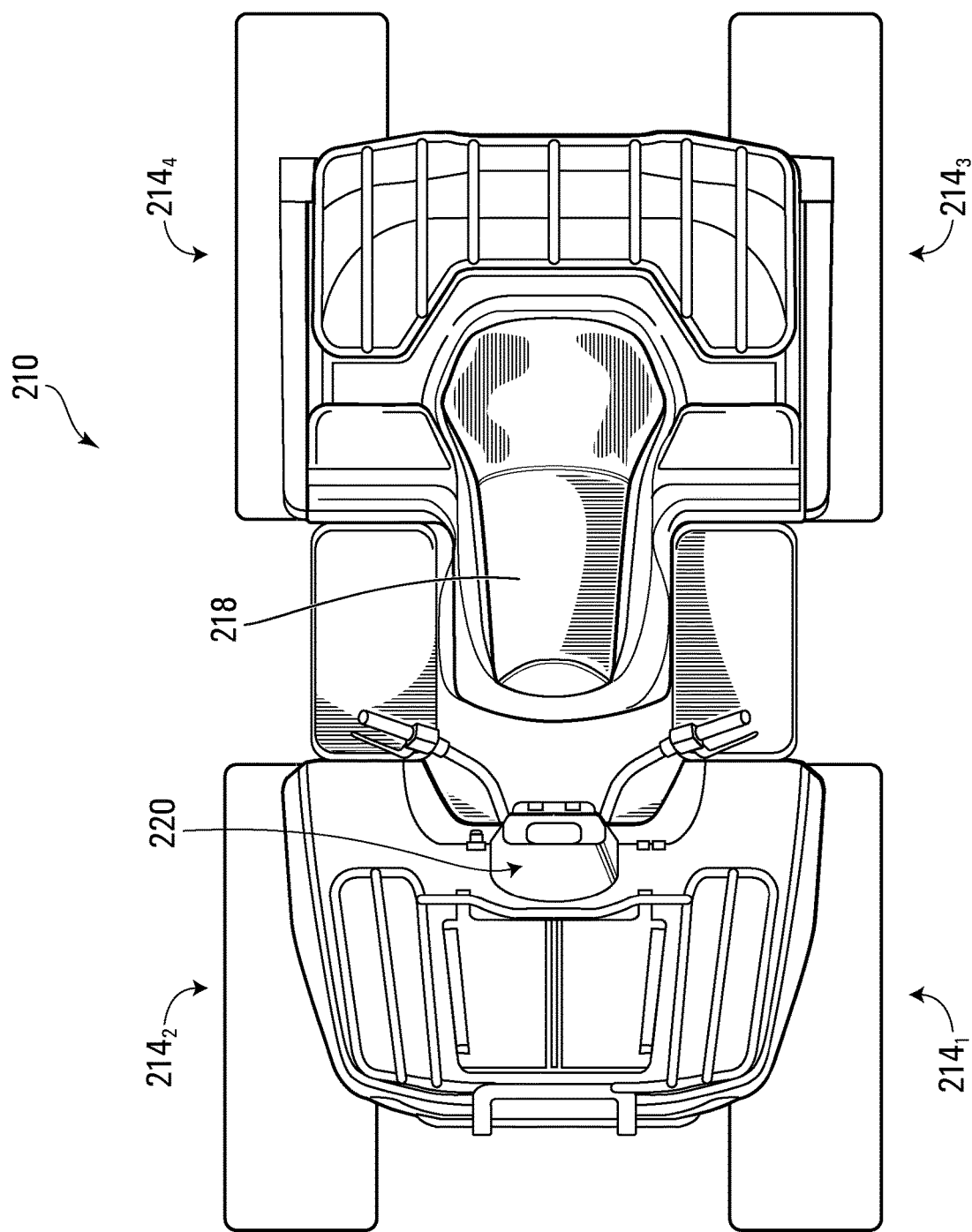
Figure 35:
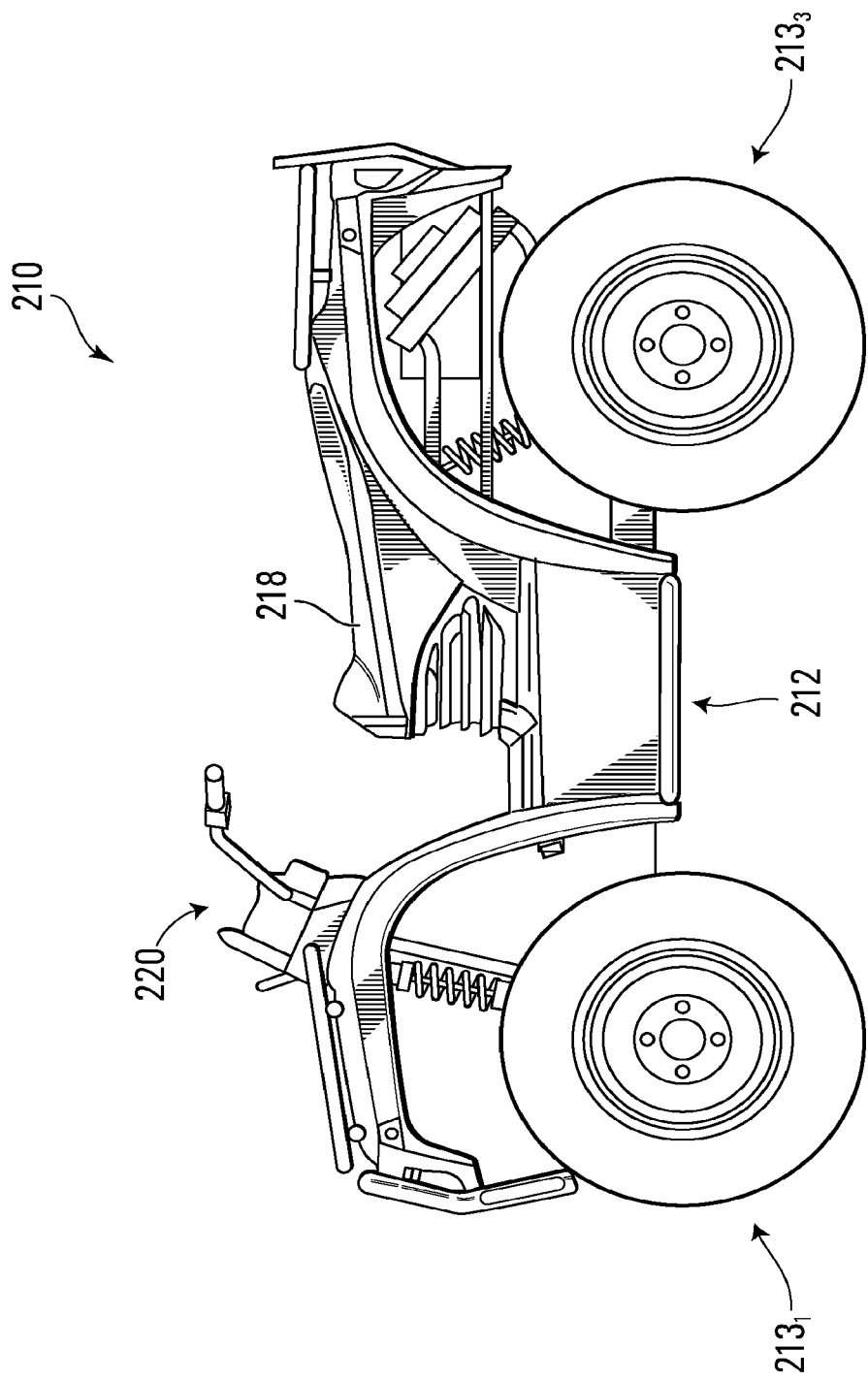
Figure 36:
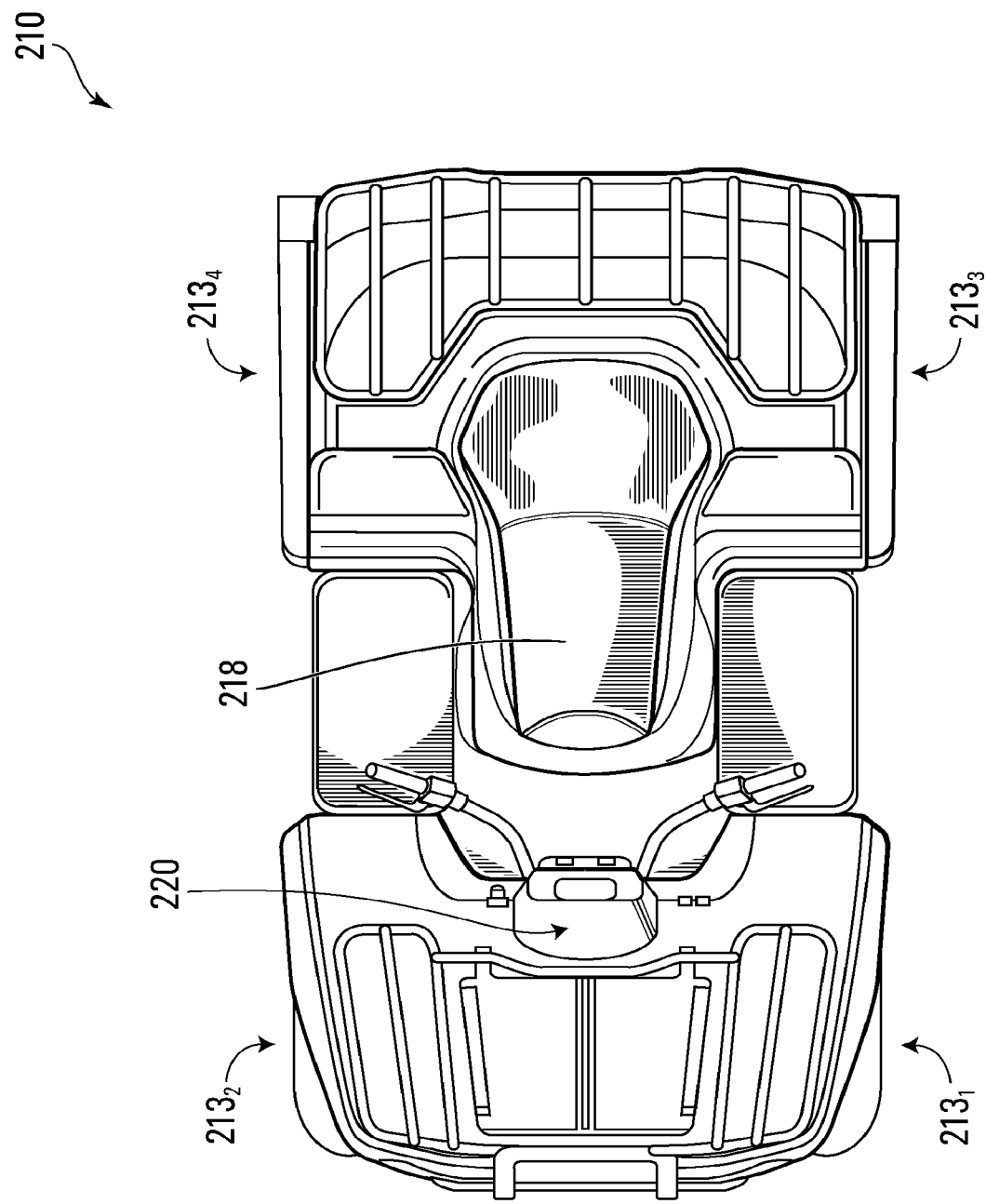

As another example, in some embodiments, as shown in FIGS. 31 and 32, the reinforcing material 51 may constitute (i) at least part of a reinforcement 45$_x$ embedded in the rubber 38 of the carcass 35 and (ii) at least part of a drive/guide lug 34$_x$ and/or at least part of a traction projection 58$_x$ that are integral with one another such that they are a one-piece structure, i.e., (1) the reinforcement 45$_x$ and (2) the drive/guide lug 34$_x$ and/or the traction projection 58$_x$ are a single unitary piece. This may help to enhance the rigidity characteristics of the track 21.

For instance, in this embodiment, the reinforcing material 51 may constitute at least part of a transversal stiffening rod 36$_x$ and at least part of the drive/guide lugs 34$_1$-34$_D$ that are integral with one another such that they are a one-piece structure. That is, in this example of implementation, as shown in FIG. 31, the transversal stiffening rod 36$_x$ and selected ones of the drive/guide lugs 34$_1$-34$_D$ aligned with the transversal stiffening rod 36$_x$ in the longitudinal direction of the track 21 constitute a single integral component 132 comprising the reinforcing material 51. This may be achieved, for example, by molding the transversal stiffening rod 36$_x$ and the selected ones of the drive/guide lugs 34$_1$-34$_D$ together out of the reinforcing material 51 to obtain the single integral component 132 which comprises the transversal stiffening rod 36$_x$ and the selected ones of the drive/guide lugs 34$_1$-34$_D$. The single integral component 132 may then be overmolded by the elastomeric material 53 to form the track 21.

While in the embodiment of FIG. 31, the drive/guide lugs 34$_1$-34$_D$ are shown as being made entirely of the reinforcing material 51, this may not necessarily be the case. For instance, in some cases, the reinforcing material 51 may be provided only along the periphery 86 the drive/guide lugs 34$_1$-34$_D$ (e.g., as a thin sheet) such as to cover at least partially (or entirely) the elastomeric material 42 of the drive/guide lugs 34$_1$-34$_D$. In order to achieve such a configuration, the reinforcing material 51 constituting the transversal stiffening rod 36$_x$ and the selected ones of the drive/guide lugs 34$_1$-34$_D$ may first be molded over the elastomeric material 42 of the drive/guide lugs 34$_1$-34$_D$.

In some embodiments, as shown in FIG. 32, the reinforcing material 51 may constitute at least part of a transversal stiffening rod 36, and at least part of the traction projections 58$_1$-58$_T$ that are integral with one another such that they are a one-piece structure. That is, the transversal stiffening rod 36, and selected ones of the traction projections 58$_1$-58$_T$ aligned with the transversal stiffening rod 36, in the longitudinal direction of the track 21 constitute a single integral component 134 comprising the reinforcing material 51. This may be achieved, for example, by molding the transversal stiffening rod 36$_x$ and the selected ones of the traction projections 58$_1$-58$_T$ together out of the reinforcing material 51 to obtain the single integral component 134 which comprises the transversal stiffening rod 36$_x$ and the selected ones of the traction projections 58$_1$-58$_T$. The single integral component 134 may then be overmolded by the elastomeric material 53 to form the track 21.

While in the embodiment of FIG. 32, the traction projections 58$_1$-58$_T$ are shown as being made entirely of the reinforcing material 51, this may not necessarily be the case. For instance, in some cases, the reinforcing material 51 may be provided only along the periphery 84 the traction projections 58$_1$-58$_T$ (e.g., as a thin sheet) such as to cover at least partially (or entirely) the elastomeric material 41 of the traction projections 58$_1$-58$_T$. In order to achieve such a configuration, the reinforcing material 51 constituting the transversal stiffening rod 36$_x$ and the selected ones of the traction projections 58$_1$-58$_T$ may first be molded over the elastomeric material 41 of the traction projections 58$_1$-58$_T$.

While in embodiments considered above the track system 14 is part of the snowmobile 10, a track system constructed according to principles discussed herein may be used as part of other off-road vehicles in other embodiments.

For example, in some embodiments, a track system constructed according to principles discussed herein may be used as part of an all-terrain vehicle (ATV).

FIGS. 33 to 36 show an ATV 210 comprising a set of track systems 214$_1$-214$_4$ providing traction to the ATV on the ground. The ATV 210 comprises a prime mover 212 in a driving relationship with the track systems 214$_1$-214$_4$ via the ATV's powertrain, a seat 218, and a user interface 220, which enable a user of the ATV 210 to ride the ATV 210 on the ground. In this case, the seat 218 is a straddle seat and the ATV 210 is usable by a single person such that the seat 218 accommodates only that person driving the ATV 210. In other cases, the seat 218 may be another type of seat, and/or the ATV 210 may be usable by two individuals, namely one person driving the ATV 210 and a passenger, such that the seat 218 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "UTV". The user interface 220 comprises a steering device operated by the user to control motion of the ATV 210 on the ground. In this case, the steering device comprises handlebars. In other cases, the steering device may comprise a steering wheel or other type of steering element. Each of the front track systems 214$_1$, 214$_2$ is pivotable about a steering axis of the ATV 210 in response to input of the user at the handlebars in order to steer the ATV 210 on the ground.

In this embodiment, each track system 214$_i$ is mounted in place of a ground-engaging wheel 213$_i$ that may otherwise be mounted to the ATV 210 to propel the ATV 210 on the ground. That is, the ATV 210 may be propelled on the ground by four ground-engaging wheels 213$_1$-213$_4$ with tires instead of the track systems 214$_1$-214$_4$. Basically, in this embodiment, the track systems 214$_1$-214$_4$ may be used to convert the ATV 210 from a wheeled vehicle into a tracked vehicle, thereby enhancing its traction and floatation on the ground.

Any feature described herein with respect to the track system 14 of the snowmobile 10, including its track 21, may be applied to a track system 214$_i$ of the ATV 210, including its track 221.

The snowmobile 10 and the ATV 210 considered above are examples of tracked recreational vehicles. While they can be used for recreational purposes, such tracked recreational vehicles may also be used for utility purposes in some cases.

Figure 37:
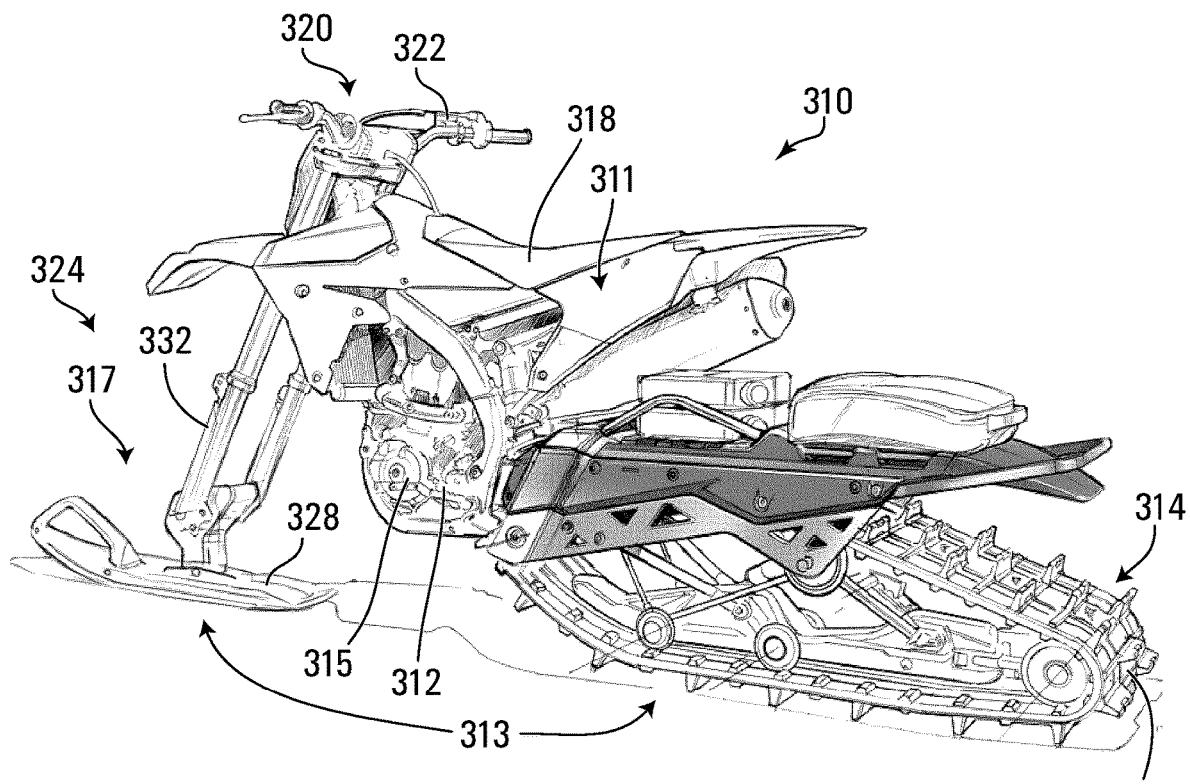
FIGS. 37 and 38 show an example of a snow bike comprising a track system in accordance with another embodiment of the invention, instead of being equipped with a rear wheel.

As another example, in some embodiments, a track system constructed according to principles discussed herein may be used as part of a snow bike. FIG. 37 shows a snow bike 310 comprising a frame 311, a powertrain 312, a ski system 317, a track system 314, a seat 318, and a user interface 320 which enables a user to ride, steer and otherwise control the snow bike 310.

Figure 38:
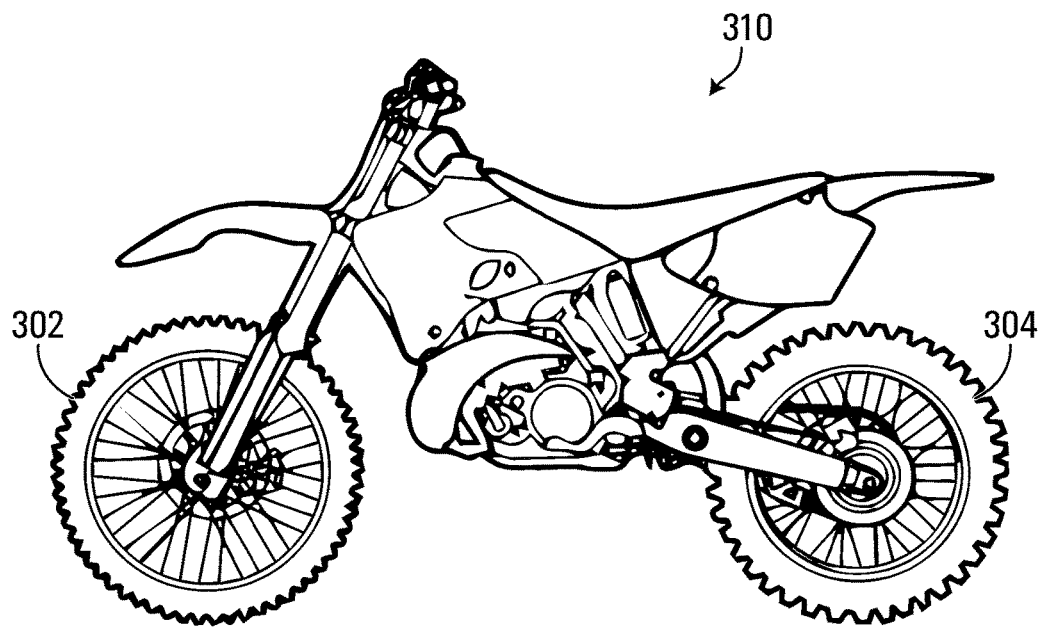

In this embodiment, as shown in FIG. 38, the snow bike 310 is a motorcycle equipped with the ski system 317 mounted in place of a front wheel 302 of the motorcycle 310 and the track system 314 mounted in place of a rear wheel 304 of the motorcycle 310. In this example, the track system 314 also replaces a rear suspension unit (e.g., a shock absorber and a swing arm) of the motorcycle. Basically, in this embodiment, the ski system 317 and the track system 314 are part of a conversion system 313 that converts the motorcycle into a skied and tracked vehicle for travelling on snow.

The powertrain 312 is configured for generating motive power and transmitting motive power to the track system 314 to propel the snow bike 310 on the ground. To that end, the powertrain 312 comprises a prime mover 315, which is a source of motive power that comprises one or more motors (e.g., an internal combustion engine, an electric motor, etc.). For example, in this embodiment, the prime mover 315 comprises an internal combustion engine. In other embodiments, the prime mover 315 may comprise another type of motor (e.g., an electric motor) or a combination of different types of motor (e.g., an internal combustion engine and an electric motor). The prime mover 315 is in a driving relationship with the track system 314. That is, the powertrain 312 transmits motive power from the prime mover 315 to the track system 314 in order to drive (i.e., impart motion to) the track system 314.

The seat 318 accommodates the user of the snow bike 310. In this case, the seat 318 is a straddle seat and the snow bike 310 is usable by a single person such that the seat 318 accommodates only that person driving the snow bike 310. In other cases, the seat 318 may be another type of seat, and/or the snow bike 310 may be usable by two individuals, namely one person driving the snow bike 310 and a passenger, such that the seat 318 may accommodate both of these individuals (e.g., behind one another).

The user interface 320 allows the user to interact with the snow bike 310 to control the snow bike 310. More particularly, in this embodiment, the user interface 320 comprises an accelerator, a brake control, and a steering device comprising handlebars 322 that are operated by the user to control motion of the snow bike 510 on the ground. The user interface 320 also comprises an instrument panel (e.g., a dashboard) which provides indicators (e.g., a speedometer indicator, a tachometer indicator, etc.) to convey information to the user.

The ski system 317 is disposed in a front 324 of the snow bike 310 to engage the ground and is turnable to steer the snow bike 310. To that end, the ski system 14 is turnable about a steering axis of the snow bike 310. The ski system 317 comprises a ski 328 to slide on the snow and a ski mount 330 that connects the ski 328 to a front steerable member 332 of the snow bike 310. In this embodiment where the snow bike 310 is a motorcycle and the ski system 317 replaces the front wheel 302 of the motorcycle, the front steerable member 332 comprises a front fork 334 of the snow bike 310 that would otherwise carry the front wheel 302.

The ski 328 is a sole ski of the snow bike 310. That is, the snow bike 310 has no other ski. Notably, the ski 328 is disposed in a center of the snow bike 310 in a widthwise direction of the snow bike 310. In this embodiment in which the snow bike 310 is a motorcycle and the ski system 317 replaces the front wheel 302 of the motorcycle, the ski 328 contacts the ground where the front wheel 302 would contact the ground.

Any feature described herein with respect to the track system 14 of the snowmobile 10, including its track 21, may be applied to the track system 314 of the snow bike 310, including its track 321.

In other embodiments, a track system constructed according to principles discussed herein may be used as part of an agricultural vehicle (e.g., a tractor, a harvester, etc.), as part of a construction vehicle, forestry vehicle or other industrial vehicle, or as part of a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being mountable around a plurality of wheels, the track comprising a ground-engaging outer surface and an inner surface opposite to the ground-engaging outer surface, the track comprising:
  an elastomeric material allowing the track to flex around the wheels; and
  a reinforcing material stronger than the elastomeric material and constituting at least part of a periphery of the track;
  wherein the track comprises a plurality of traction projections projecting from the ground-engaging outer surface, each of the traction projections being an elastomeric traction projection comprising the elastomeric material and the reinforcing material, and wherein the reinforcing material comprises a reinforcing polymeric film being adhered to at least part of a periphery of the elastomeric traction projection.

2. The track of claim 1, wherein the reinforcing material constitutes at least part of a periphery of the ground-engaging outer surface.

3. The track of claim 1, wherein the reinforcing material constitutes at least part of a periphery of the inner surface.

4. The track of claim 1, comprising a plurality of wheel-contacting projections projecting from the inner surface, wherein the reinforcing material constitutes at least part of a periphery of each of the wheel-contacting projections.

5. The track of claim 1, wherein a ratio of a thickness of the reinforcing material over a thickness of the elastomeric material is no more than 0.1.

6. The track of claim 1, wherein a ratio of a thickness of the reinforcing material over a thickness of the elastomeric material is no more than 0.05.

7. The track of claim 1, wherein the reinforcing material is stiffer than the elastomeric material.

8. The track of claim 1, wherein the reinforcing material is harder than the elastomeric material.

9. The track of claim 1, wherein the reinforcing material is more resistant to wear than the elastomeric material.

10. The track of claim 1, wherein the reinforcing material comprises ultra-high-molecular-weight polyethylene.

11. The track of claim 1, wherein the track generates less noise than if the reinforcing material was omitted.

12. The track of claim 1, wherein a thickness of the track from the ground-engaging outer surface to the inner surface is no more than 0.2 inches.

13. The track of claim 1, wherein the reinforcing polymeric film is configured to provide an asymmetrical bending stiffness of the elastomeric traction projection along a longitudinal direction of the track.

14. A track for traction of a vehicle, the track being mountable around a plurality of wheels, the track comprising a ground-engaging outer surface and an inner surface opposite to the ground-engaging outer surface, the track comprising:
  an elastomeric material allowing the track to flex around the wheels; and
  an ultra-high-molecular-weight polyethylene constituting at least part of a periphery of the track;
  wherein the track comprises a plurality of traction projections projecting from the ground-engaging outer surface, each of the traction projections being an elastomeric traction projection comprising the elastomeric material and the ultra-high-molecular-weight polyethylene, and
  wherein the ultra-high-molecular-weight polyethylene forms a reinforcing polymeric film being adhered to at least part of a periphery of the elastomeric traction projection.

15. The track of claim 14, wherein the ultra-high-molecular-weight polyethylene constitutes at least part of a periphery of the ground-engaging outer surface.

16. The track of claim 14, wherein the ultra-high-molecular-weight polyethylene constitutes at least part of a periphery of the inner surface.

17. The track of claim 14, comprising a plurality of wheel-contacting projections projecting from the inner surface, wherein the ultra-high-molecular-weight polyethylene constitutes at least part of a periphery of each of the wheel-contacting projections.

18. The track of claim 14, wherein a ratio of a thickness of the ultra-high-molecular-weight polyethylene over a thickness of the elastomeric material is no more than 0.1.

19. The track of claim 14, wherein a ratio of a thickness of the ultra-high-molecular-weight polyethylene over a thickness of the elastomeric material is no more than 0.05.

20. The track of claim 14, wherein the reinforcing polymeric film is configured to provide an asymmetrical bending stiffness of the elastomeric traction projection along a longitudinal direction of the track.

\* \* \* \* \*